United States Patent
Sato

(10) Patent No.: US 11,181,386 B2
(45) Date of Patent: Nov. 23, 2021

(54) NAVIGATION DEVICE, DESTINATION GUIDING SYSTEM, AND NON-TRANSITORY RECORDING MEDIUM

(71) Applicant: ALPINE ELECTRONICS, INC., Tokyo (JP)

(72) Inventor: Hiroyuki Sato, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 150 days.

(21) Appl. No.: 16/148,247

(22) Filed: Oct. 1, 2018

(65) Prior Publication Data

US 2019/0107402 A1    Apr. 11, 2019

(30) Foreign Application Priority Data

Oct. 5, 2017 (JP) .............................. JP2017-195131

(51) Int. Cl.
*G01C 21/34* (2006.01)
*G05D 1/00* (2006.01)
(Continued)

(52) U.S. Cl.
CPC ....... *G01C 21/3415* (2013.01); *G01C 21/362* (2013.01); *G01C 21/3685* (2013.01);
(Continued)

(58) Field of Classification Search
CPC .............. G01C 21/3415; G01C 21/362; G01C 21/3685; G01C 21/3664; G05D 1/0088;
(Continued)

(56) References Cited

U.S. PATENT DOCUMENTS 5,103,400 A * 4/1992 Yamada ............... G01C 21/362
340/932.2
5,906,654 A * 5/1999 Sato ................... G01C 21/3605
701/418

(Continued)

FOREIGN PATENT DOCUMENTS

JP   2001-091280     4/2001
JP      3357778     12/2002
(Continued)

OTHER PUBLICATIONS

Otsuka, JP 2002296062, Oct. 9, 2002 (machine translation).*
Japanese Office Action for 2017-195131 dated Jun. 29, 2021.

*Primary Examiner* — Thomas Ingram
*Assistant Examiner* — Omar K Morsy
(74) *Attorney, Agent, or Firm* — IPUSA, PLLC

(57) ABSTRACT

A navigation device for guiding a moving body to a destination is provided. The navigation device includes: a position detecting unit configured to detect a position of the moving body; a first determining unit configured to determine whether or not the moving body has arrived at the destination based on the position detected by the position detecting unit; a second determining unit configured to determine whether or not the destination can be entered when it is determined that the moving body has arrived at the destination; and a destination setting unit configured to choose an alternate destination when it is determined by the second determining unit that the destination cannot be entered.

10 Claims, 18 Drawing Sheets

A drastic change has been made to the section (taking time until an update of map DB)

(51) Int. Cl.
*G06K 9/00* (2006.01)
*G06K 9/32* (2006.01)
*G01C 21/36* (2006.01)

(52) U.S. Cl.
CPC ....... *G05D 1/0088* (2013.01); *G06K 9/00805* (2013.01); *G06K 9/00818* (2013.01); *G06K 9/3258* (2013.01); *G01C 21/3664* (2013.01); *G05D 2201/0213* (2013.01); *G06K 2209/01* (2013.01)

(58) Field of Classification Search
CPC ....... G05D 2201/0213; G06K 9/00805; G06K 9/00818; G06K 9/3258; G06K 2209/01
See application file for complete search history.

(56) References Cited

U.S. PATENT DOCUMENTS

| | | | | |
|---|---|---|---|---|
| 9,076,334 | B2* | 7/2015 | Schirmer | G08G 1/096872 |
| 2002/0037104 | A1* | 3/2002 | Myers | G06K 9/3258 |
| | | | | 382/187 |
| 2006/0224313 | A1* | 10/2006 | Ohashi | G01C 21/3611 |
| | | | | 701/533 |
| 2009/0030607 | A1* | 1/2009 | Sakata | G01C 21/3685 |
| | | | | 701/533 |
| 2011/0133959 | A1* | 6/2011 | Suzuki | G08G 1/14 |
| | | | | 340/932.2 |
| 2014/0132767 | A1* | 5/2014 | Sonnabend | G06K 9/00476 |
| | | | | 348/148 |
| 2015/0168165 | A1* | 6/2015 | Suzuki | G01C 21/3476 |
| | | | | 701/538 |
| 2016/0180712 | A1* | 6/2016 | Rosen | G01C 21/36 |
| | | | | 705/5 |
| 2017/0028985 | A1* | 2/2017 | Kiyokawa | B62D 15/0285 |
| 2018/0087922 | A1* | 3/2018 | Wu | G01C 21/3679 |
| 2018/0120123 | A1* | 5/2018 | Seok | G01C 21/3691 |
| 2018/0217598 | A1* | 8/2018 | Kuhara | G06Q 10/08 |
| 2018/0245943 | A1* | 8/2018 | Chandra | G01C 21/265 |
| 2018/0354502 | A1* | 12/2018 | Yaldo | H04W 4/46 |
| 2018/0357906 | A1* | 12/2018 | Yaldo | B62D 15/0285 |
| 2019/0018427 | A1* | 1/2019 | Jeon | G05D 1/0274 |
| 2020/0017099 | A1* | 1/2020 | Yamaguchi | G08G 1/16 |
| 2020/0050212 | A1* | 2/2020 | Mimura | G08G 1/16 |

FOREIGN PATENT DOCUMENTS

| | | |
|---|---|---|
| JP | 2008-009913 | 1/2008 |
| JP | 2011-191169 | 9/2011 |
| JP | 2011-215049 | 10/2011 |

* cited by examiner

FIG.1
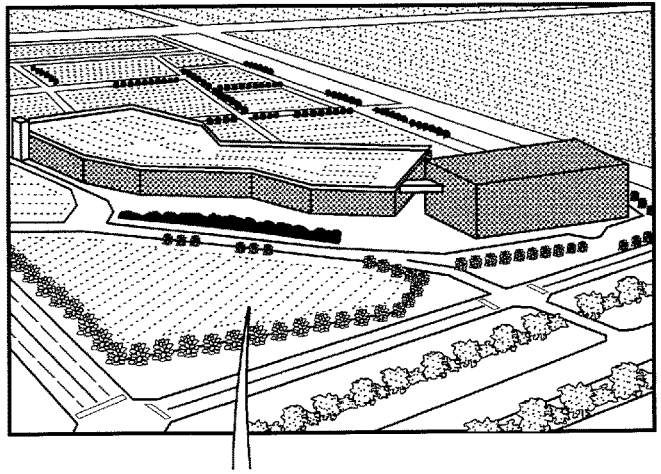
A drastic change has been made to the section (taking time until an update of map DB)
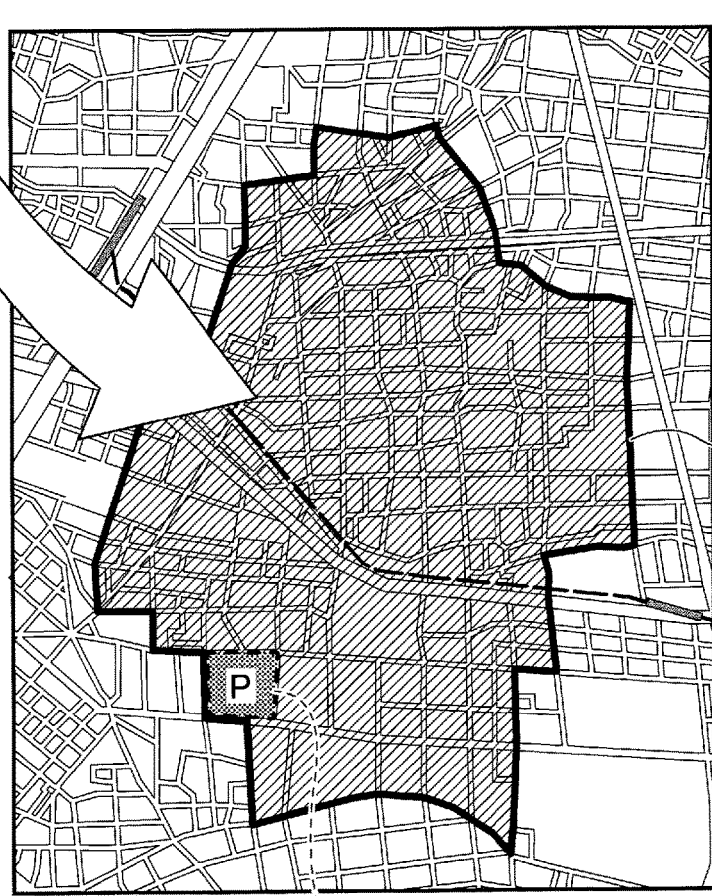
201
202

FIG.2
(a) DETECT THAT PARKING LOT IS UNAVAILABLE
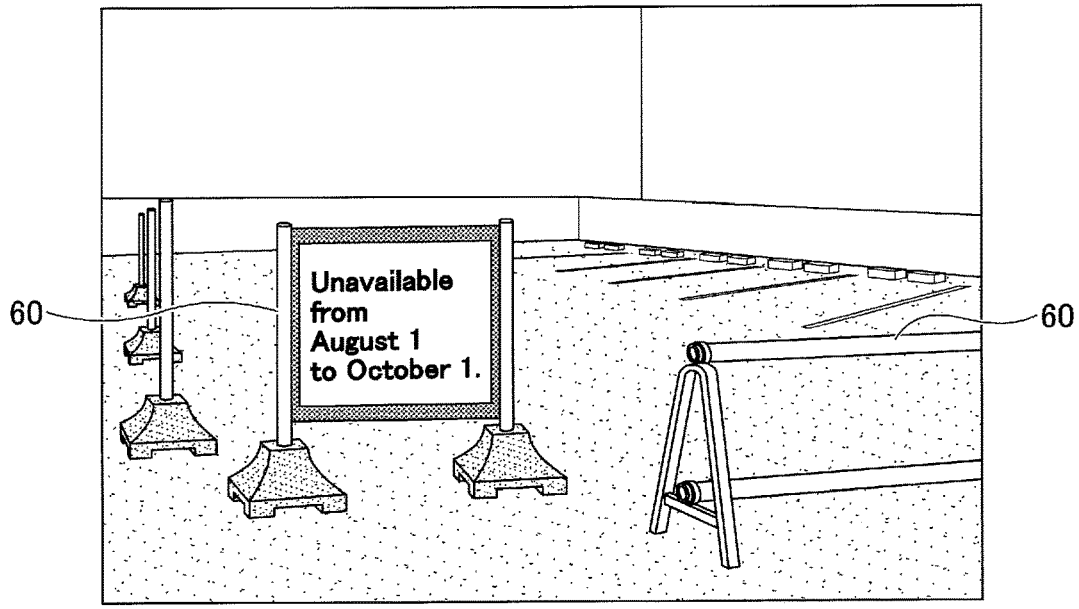
(b) SET ANOTHER PARKING LOT AND CONTINUE DRIVING
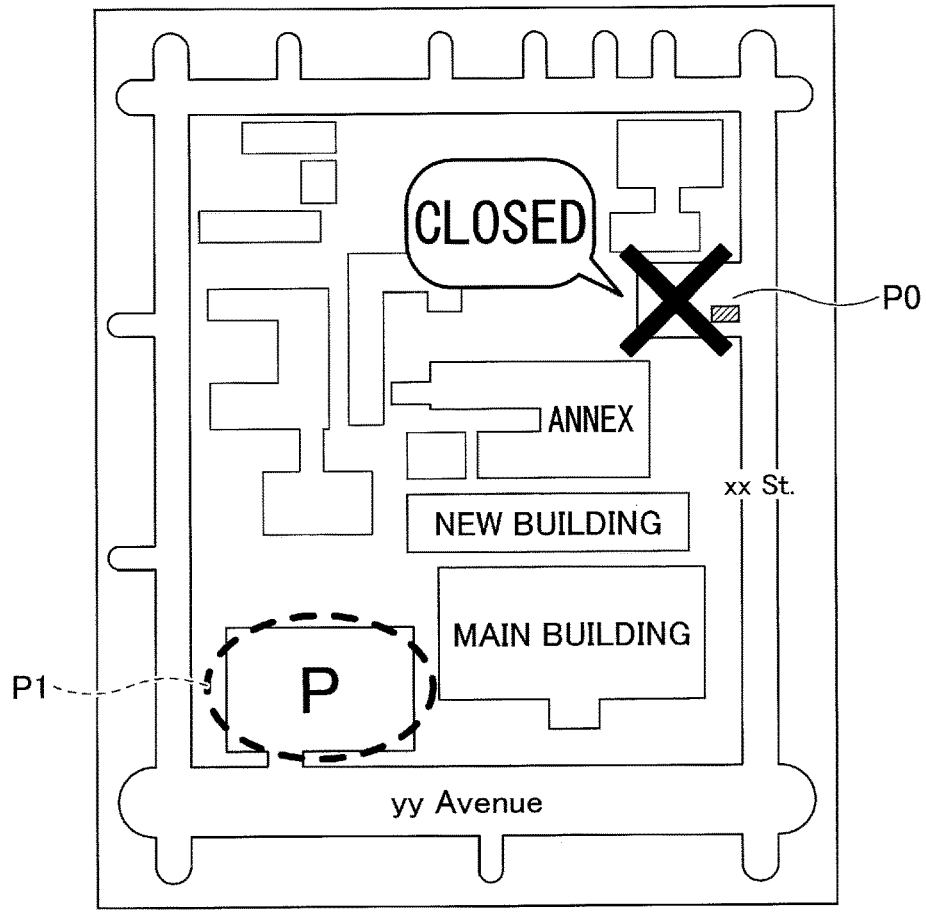

FIG.3
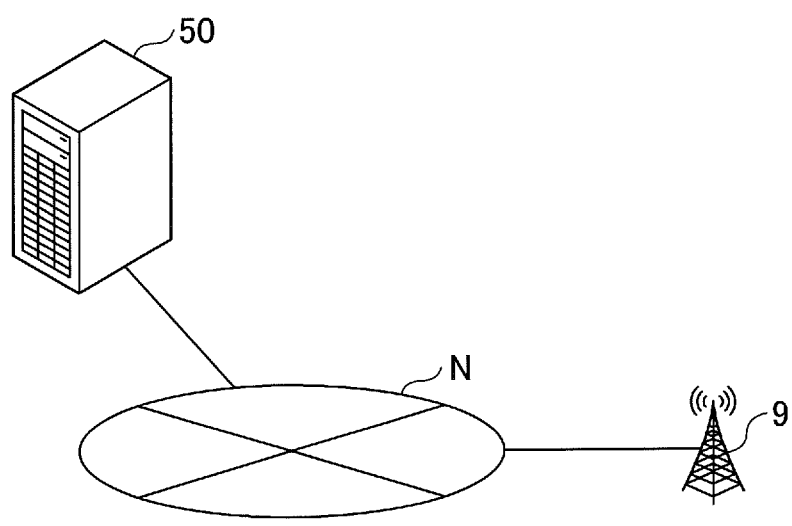
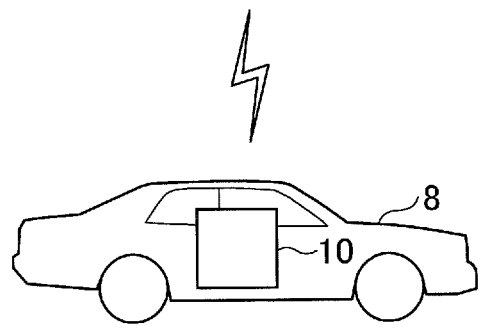

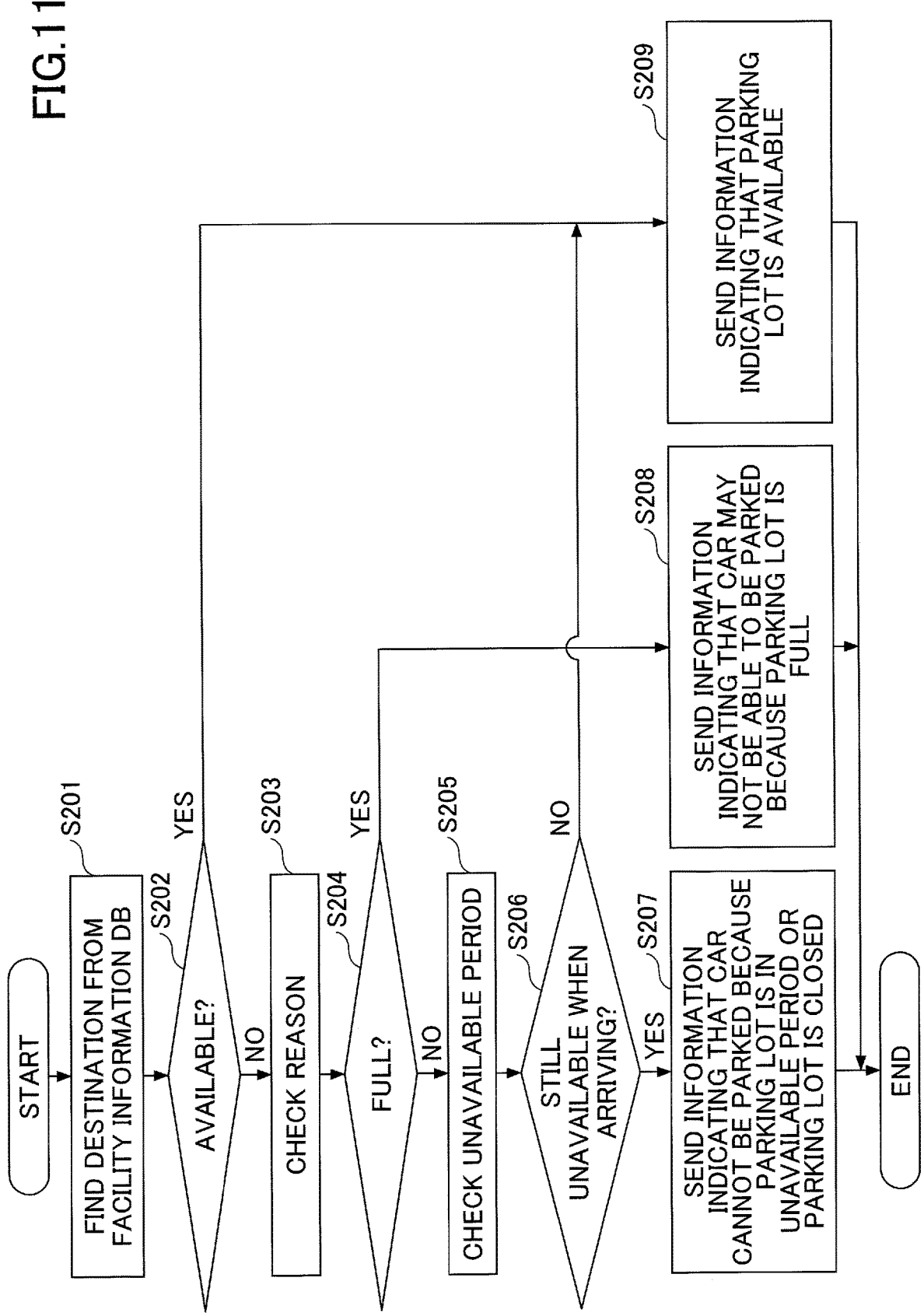

NAVIGATION DEVICE, DESTINATION GUIDING SYSTEM, AND NON-TRANSITORY RECORDING MEDIUM

CROSS-REFERENCE TO RELATED APPLICATIONS

This patent application is based upon and claims priority to Japanese Patent Application No. 2017-195131 filed on Oct. 5, 2017, the entire contents of which are incorporated herein by reference.

BACKGROUND OF THE INVENTION

1. Field of the Invention

The present invention generally relates to a navigation device, a destination guidance system, and a non-transitory recording medium.

2. Description of the Related Art

A navigation device used for indicating a route to a destination is known. In the navigation system, when a destination of a moving body is set, a route to a destination is rendered on a road map displayed on a display device, or audio guidance of the route is output. Further, another known navigation device has a function for setting, as a destination, a parking lot of a target facility or a parking lot near the target facility, in response to receiving a designation of the target facility. In order to guide a user to an appropriate parking lot for a target facility, a navigation device should preferably have the latest road map. Thus, the navigation device periodically updates its own road map by downloading the latest road map. However, the latest status of a target facility may not be reflected in the road map.

FIG. 1 illustrates an example in which information update of a road map with respect to a location of a parking lot for a target facility may be delayed. In the example illustrated in FIG. 1, premises 201 as a destination are illustrated in a road map, and a parking lot 202 is provided in a part of the premises 201. However, when a change of sections or the like in the premises 201 occurs, a location of the parking lot 202 may be changed because a new building is constructed in the premises 201 or because a change of roads occurs in the premises 201. Because it is difficult for a developer of a road map to know a location change of the parking lot 202 in such a private land, as compared to a case in which a location of a public road is changed, it tends to take time for the location change of the parking lot 202 to be reflected in the road map. If such a location change of a parking lot is not reflected in a road map, a problem may occur in which an actual location of a parking lot differs from a location of the parking lot on the road map, or in which parking is prohibited in the parking lot illustrated on the road map. Such a problem may occur in a parking lot for not only large scale facilities such as a shopping mall, but also for a small-scale facility in which a parking lot and a facility are located in the same place. Possibly, such a problem may occur in other types of parking lots, such as a self-parking garage.

If an actual location of a parking lot differs from a location of the parking lot on the road map, a driver will find that the location of the parking lot 202 has been changed and will need to find another parking lot near a destination. Such an operation is annoying for the driver. To solve such a problem, a navigation device with improved operability is proposed (see Patent Document 1, for example). After a navigation device disclosed in Patent Document 1 determines that the vehicle arrives at a destination, based on position information of a vehicle, if the vehicle restarts driving within a predetermined time, the navigation device resets a similar POI (Point Of Interest) belonging to the same category as the destination, to be a new destination.

However, in the technique disclosed in Patent Document 1, resetting of a destination cannot be made until a predetermined time elapses after a vehicle has stopped. Also, in a case in which a parking lot is not located at a place illustrated on a road map, or in which parking is prohibited even if a parking lot is located at a place illustrated on a road map, since a vehicle cannot be stopped, resetting of a new destination cannot be made.

Further, research for autonomous driving technology has been progressing in recent years, and driving a vehicle on a public road based on the autonomous driving technology will be realized in the future. In the autonomous driving technology, an autonomous driving device generates an action plan based on a destination set by a user, and the autonomous driving device drives a vehicle to the destination autonomously based on the action plan. However, the autonomous driving technology does not consider the case in which a parking lot is not located at a place illustrated on a road map, or in which parking is prohibited even if a parking lot is located at a place illustrated on a road map. Thus, for example, when such cases occur, a vehicle might remain in a stopped state, or the vehicle might waste time for finding the parking lot near a destination.

CITATION LIST

[Patent Document]
[Patent Document 1] Japanese Patent No. 3357778

SUMMARY OF THE INVENTION

The present invention is made in light of the above problems, and provides a navigation device capable of setting an appropriate destination of a moving body.

A navigation device for guiding a moving body to a destination is provided. The navigation device includes: a position detecting unit configured to detect a position of the moving body; a first determining unit configured to determine whether or not the moving body has arrived at the destination based on the position detected by the position detecting unit; a second determining unit configured to determine whether or not the destination can be entered when it is determined that the moving body has arrived at the destination; and a destination setting unit configured to choose an alternate destination when it is determined by the second determining unit that the destination cannot be entered.

BRIEF DESCRIPTION OF THE DRAWINGS

FIG. 1 illustrates an example in which information update of a road map may be delayed, with respect to a location of a parking lot for a target facility;

FIG. 2 illustrates an example of a process performed by a navigation device when a parking lot is not available;

FIG. 3 is an example of an overview configuration of a destination guiding system;

FIG. 11 is a flowchart illustrating an example of a flow of operations when the road map server determines availability of a destination parking lot;

DETAILED DESCRIPTION OF EMBODIMENTS

Figure 4:
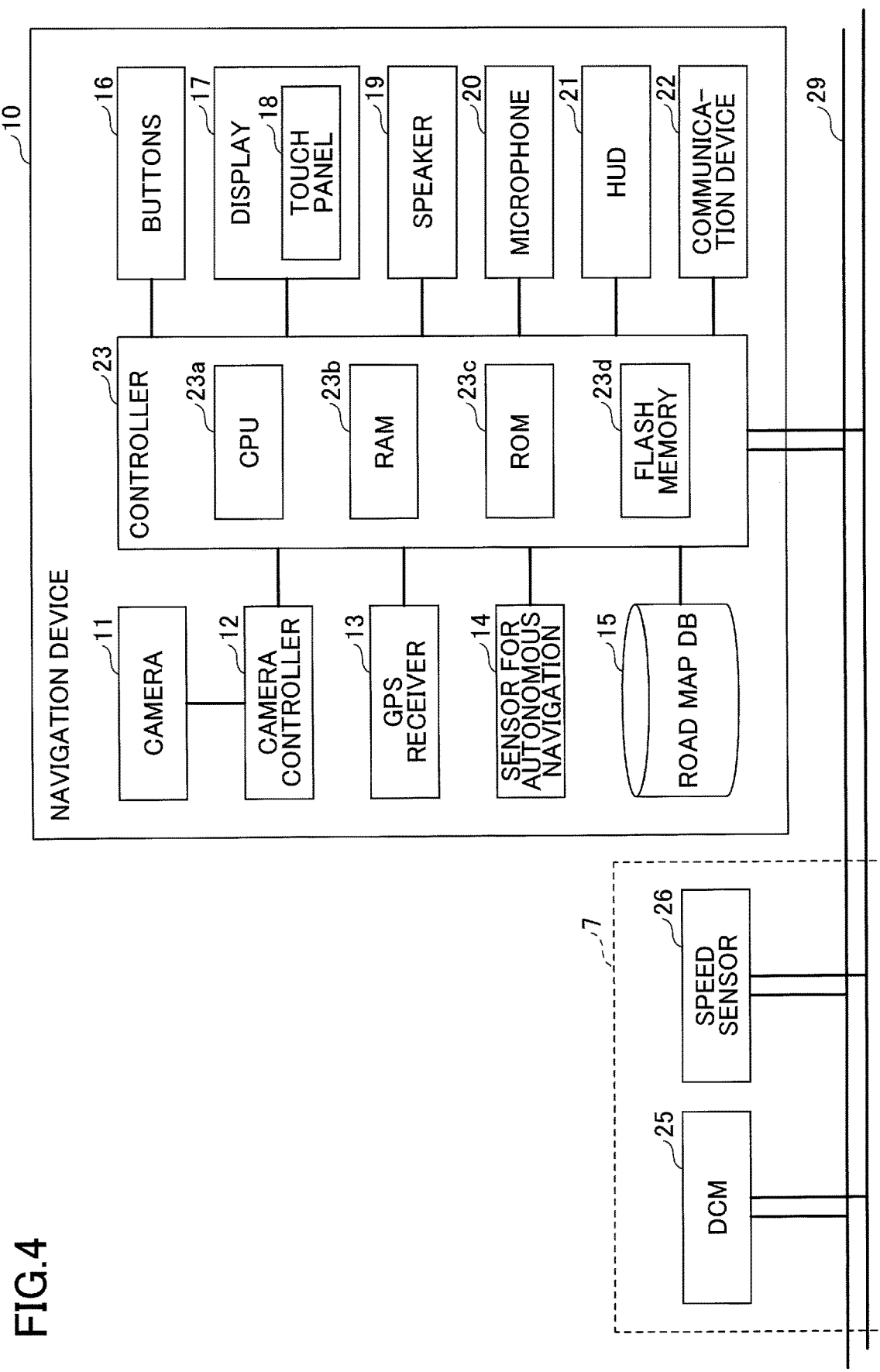
FIG. 4 is a hardware configuration diagram illustrating an example of a hardware configuration of the navigation device and an in-vehicle system.

Embodiments of the present invention will be described in the following.

First Embodiment

An overview of an operation of a navigation device according to a first embodiment will be described with reference to FIG. 2. FIG. 2 illustrates an example of a process performed by the navigation device when a parking lot is not available. FIG. 2 illustrates a case in which a driver has driven a vehicle to a parking lot of a destination, in accordance with guidance by the navigation device.

As illustrated in an upper figure (hereinafter referred to as a "diagram (a)") of FIG. 2, the navigation device determines that the vehicle cannot be parked in the parking lot, by detecting, using a sensor, that blocking objects 60 such as a signboard and a fence are present. The diagram (a) of FIG. 2 illustrates a case in which a signboard and a fence are placed at an entrance of the parking, and the navigation device detects that there is no space to enter the parking lot.

As illustrated in a lower figure (diagram (b)) of FIG. 2, when the navigation device detects that a parking lot P0 which is an original destination is not available, the navigation device resets a parking lot P1 in premises of a target facility to be a new destination. When a parking lot does not exist in the premises, a parking lot in the vicinity of the parking lot P0 may be chosen. As the navigation device performs the above mentioned resetting operation, the driver can drive the vehicle to the new destination without performing resetting of a destination by himself/herself.

As described above, because the navigation device according to the present embodiment automatically detects that a parking lot which has been set as a destination is not available, and the navigation device resets another destination, a driver can reach a parking lot closer to a target facility with fewer operations. Therefore, the navigation device can improve convenience and operability.

Definition of Terms

In the present disclosure, a "moving body" refers to an object driven by power from a certain power source, or an object driven by human power. Examples of the moving body include an automobile, a bicycle, and a motorcycle. In the present embodiment, a case in which a moving body is an automobile will be explained.

A term "cannot enter" (or "entry is prohibited") includes a case in which a moving body cannot enter because the moving body may hit an obstacle, and a case in which it is determined that a moving body cannot enter because of detection of information indicating inability of entry. Also, a purpose of entry depends on a type of a destination. For example, a phrase "cannot enter a parking lot" means that a vehicle cannot be parked in a parking lot.

A blocking object 60 refers to an object having a function of prohibiting entry to a destination. "Prohibiting" means not only blocking entry completely, but also restraining from entering, causing hesitation in entering, preventing entry, and the like. "Entry" refers to an action to enter, but instead of "entry", other terms such as "going into", "getting into", "crossing a perimeter", or the like, may be used.

<Example of Configuration>

FIG. 3 is an example of an overview configuration of a destination guiding system 100. The destination guiding system 100 includes a road map server 50, and a navigation device 10 configured to communicate with the road map server 50 via a network N. The network N includes a public network provided by a telecommunications carrier such as a cellular network, a wireless LAN, or a WiMAX network, and a provider network provided by a network service provider (a business organization that provides a service to connect to the Internet). To enable the navigation device 10 to connect to a public network provided by a telecommunications carrier, a base station 9 is connected to the network N.

The road map server 50 is an information processing apparatus for providing the latest road map to the navigation device 10. Thus, the road map server 50 maintains the latest road map. However, as the navigation device 10 can reset a destination if the navigation device 10 has a road map, the road map server 50 is not an essential element in the destination guiding system 100. The road map server 50 is used by the navigation device 10 so that the navigation device 10 can easily update a road map of the navigation device 10 and that the navigation device 10 can perform guidance using the latest road map.

The navigation device 10 finds a route from a place of departure to a destination, renders the route and a current position on an electronic map displayed on a display, and guides a user towards an appropriate direction based on the route, by providing voice guidance or an animated image just before reaching a turning point. The navigation device 10 may also have other functions such as an AV (Audio Visual) playback function, a communication function via the Internet, and the like. By driving a car 8 in accordance with guidance provided by the navigation device 10, a driver can arrive at a destination. Note that the destination guiding system 100 may be configured such that, among the above described functions performed by the navigation device 10, the function for finding a route is performed by the road map server 50 and that information of the route is supplied from the road map server 50 to the navigation device 10. Further, the navigation device 10 may provide position information of the car 8 to the road map server 50 and the road map server 50 may perform a function for finding a route and a function for guidance.

The navigation device 10 may be embodied by a general purpose information processing terminal, or a dedicated terminal device for navigation (which may be referred to as a PND (Portable Navigation Device)). Examples of the general purpose information processing terminal include a smartphone, a tablet terminal, a cellular phone, a PDA (Personal Digital Assistant), a laptop PC, and a wearable computer (such as a wristwatch-type wearable computer, or a glasses-like wearable computer). These general purpose information processing terminals are usually used as an information processing terminal. When an application program for navigation is executed, these general purpose information processing terminals perform functions such as route finding or route guidance, similar to a dedicated terminal device for navigation.

Alternatively, the navigation device 10 may be embodied by interoperation (communication) of a general purpose information processing terminal and a dedicated terminal device for navigation. For example, the navigation device 10 may be configured such that a map application program installed in a general purpose information processing terminal substantially provides navigation functions and that a dedicated terminal device for navigation displays a screen image generated by the map application program, by obtaining the screen image through a communication path. Examples of such a map application program include Car-Play (registered trademark), and Android Auto (registered trademark).

As mentioned above, in a case in which the navigation device 10 is embodied by interoperation of the dedicated terminal device for navigation and the general purpose information processing terminal, the dedicated terminal device for navigation may be referred to as a "Display Audio" device (or "connected audio device"). The Display Audio is a device mainly providing an AV function and a communication function, not having a navigation function.

For the navigation device 10, whether embodied by a general purpose information processing terminal or a dedicated terminal device for navigation, the navigation device 10 may be configured such that the navigation device 10 can be switched between a state installed in a car and a portable state. That is, the navigation device 10 may be a detachable device.

<Hardware Configuration>

FIG. 4 is a hardware configuration diagram illustrating an example of a hardware configuration of the navigation device 10 and an in-vehicle system 7. The navigation device 10 is controlled by a controller 23. To the controller 23, a camera controller 12 (for controlling a camera 11 and for performing image processing), a GPS receiver 13, a sensor for autonomous navigation 14, a road map DB 15, buttons 16, a display (display device) 17 with a touch panel 18, a speaker 19, a microphone 20, a head up display (HUD) 21, and a communication device 22 are connected. Note that the illustrated hardware elements are just for explanation of the present embodiment, and they are merely examples of hardware elements included in the navigation device 10.

The in-vehicle system 7 includes a data communication module (DCM) 25 and a speed sensor 26. The DCM 25 is a communication device used for communicating with the base station 9 of a telecommunications carrier such as a cellular phone company. The speed sensor 26 is a sensor for detecting a rotation of a wheel by using a pulse signal, and the controller 23 detects a rotational speed of the wheel based on the number of detected pulse signals per unit of time. With respect to the in-vehicle system 7, illustration of hardware elements which are not required for describing the present embodiment is omitted.

As the navigation device 10 and the in-vehicle system 7 are connected with each other via a CAN (Controller Area Network) bus 29, the navigation device 10 can utilize speed of a car or the communication function. However, a configuration described here is merely an example. In another embodiment, the navigation device 10 may include a function for detecting speed of a car. Further, if the navigation device 10 includes a communication function, the in-vehicle system 7 is not required to have a DCM.

The controller 23 is a device called a microcontroller, an information processing apparatus, or a computer. The controller 23 performs an overall control of the navigation device 10, and performs an input of information, a processing of information, and an output of information. The controller 23 includes a CPU 23a, a RAM 23b, a ROM 23c, a flash memory 23d, and the like. The controller 23 also includes functional elements similar to those included in a generic ECU (Electronic Control Unit), such as a CAN controller, a timer, an I/O port, and the like. Further, an HDD (Hard Disk Drive) may be connected to the controller 23, in order to supplement a shortage of capacity of the flash memory 23d.

The camera 11 is an image capturing device which converts incident light into image data including brightness information by a photoelectric transducer, such as a CCD or CMOS. The camera 11 periodically transmits image data to the camera controller 12. The camera 11 is fitted to the car 8 such that the camera 11 can capture at least an image in front of the car 8. Further, other cameras may be fitted to the car 8 such that the cameras can capture a side image or a backward image of the car 8. The camera 11 is an example of a sensor used for capturing the blocking object 60 such as a signboard, which is disposed at an entrance of a parking lot.

The camera controller 12 is an IC for applying an image processing to image data captured by the camera 11. In the present embodiment, the blocking object 60 (such as a signboard, a fence for construction, or a traffic cone) needs to be detected. As the camera controller 12 learns features of the blocking object 60 in advance by using a machine learning algorithm such as deep learning, support vector machine, neural network, or random forest, the camera controller 12 can detect whether the blocking object 60 has been captured or not. Alternatively, an attendant of a parking lot may be recognized as the blocking object 60, from image data.

A method of detecting the blocking object 60 is not limited to an image processing of image data. For example, an obstacle detecting device, such as millimeter-wave radar, LIDAR (Light Detection and Ranging, or Laser Imaging Detection and Ranging), or an ultrasonic sensor, may be used for detecting that the car 8 cannot enter from an entrance of a parking lot. The obstacle detecting device is also an example of a sensor used for detecting the blocking object 60 placed at an entrance of a parking lot. The obstacle detecting device differs from the camera controller 12 in that the obstacle detecting device may not be able to detect specific features of an object. However, the obstacle detecting device can detect that the car 8 cannot park in a parking lot because of an obstacle.

The GPS receiver 13 detects a position of a car using GPS satellites. The sensor for autonomous navigation 14 is a sensor such as an accelerometer, a gyrosensor, or a magnetic field sensor, for estimating a position or a driving direction of a car by autonomous navigation. As the sensor for autonomous navigation 14 can calculate speed of a car using an accelerometer, the calculated speed can be used instead of speed obtained from the speed sensor 26.

The road map DB 15 is a storage device such as a hard disk drive, for storing road map data. The road map data is downloaded from the road map server 50. The road map data is data of a road configuration represented by connecting a node with a link. As the node and the link each have coordinates, a position of the car 8 on a road map can be recognized based on the road map data. Also, as location information of facilities such as a parking lot is included in the road map data, the navigation device 10 can detect a parking lot by designating a location. Note that the road map data also includes rendering information for rendering an electronic map on the display 17, such as polylines, polygons, and points.

The buttons 16 are switches, buttons, touch sensors, or the like, which are frequently used by a driver. Examples of the buttons 16 include a power button, a volume-control button, and an eject button for a CD or DVD. The display 17 is a displaying device such as an LCD (Liquid Crystal Display) or an organic EL. The display 17 integrally has the touch panel 18. The touch panel 18 detects coordinates of a location where touched with the user's finger, and outputs the coordinates to the controller 23.

The speaker 19 outputs audio guidance, and the microphone 20 collects sound to recognize a driver's voice. The voice recognition may be performed in both the car 8 and a server. The HUD 21 displays information on a translucent combiner provided in a driver's view (or front glass). The communication device 22 is similar to the DCM 25, which has a function to communicate with the base station 9.

A hardware configuration of the road map server 50 is similar to that of a generic information processing apparatus. That is, the road map server 50 includes a CPU, a RAM, a ROM, an HDD (Hard Disk Drive), a network card, an input device, and an output device. Because the hardware configuration of the road map server 50 is general, illustration of these hardware elements are omitted. The road map server 50 may be a cloud computing environment. The road map server 50 may also be referred to as other names, such as a navigation server or a destination guiding server.

<Functional Configuration>

Figure 5:
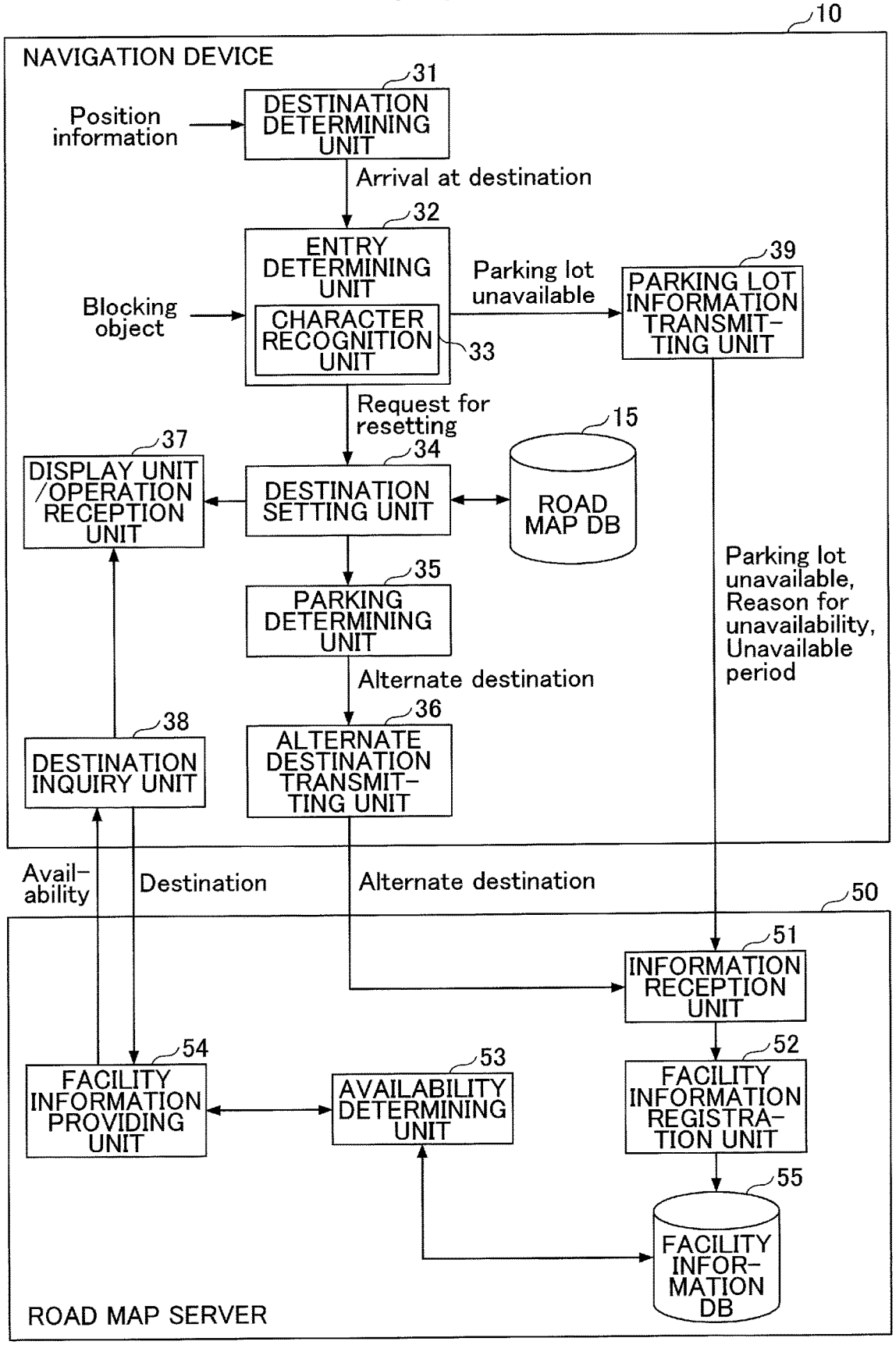
FIG. 5 is an example of a functional block diagram illustrating functions of the navigation device and a road map server as a block diagram.

FIG. 5 is an example of a functional block diagram illustrating functions of the navigation device 10 and the road map server 50 as a block diagram.

<<Navigation Device>>

The navigation device 10 includes the following functional elements: a destination determining unit 31, an entry determining unit 32, a destination setting unit 34, a parking determining unit 35, an alternate destination transmitting unit 36, a display unit/operation reception unit 37, a destination inquiry unit 38, and a parking lot information transmitting unit 39. These functional elements are embodied by the controller 23 illustrated in FIG. 4 executing a program loaded into the RAM 23b from the flash memory 23d, to interoperate with hardware elements in the navigation device 10. Part or all of the functional elements may be implemented by hardware, such as an IC.

The destination determining unit 31 determines whether the car 8 has arrived at a destination or not, based on position information of the car 8. In a case in which a target facility is a small-sized facility such as a convenience store or a small self-parking garage, the target facility is treated as a destination. In a case in which a target facility is a large facility such as a shopping mall, a parking lot in the premises of the target facility is a destination. The present embodiment is applicable to both cases. The road map server 50 or the navigation device 10 may set a parking lot corresponding to a target facility as a destination. If there is no parking lot corresponding to a target facility, the road map server 50 or the navigation device 10 may set a parking lot close to a target facility as a destination.

Whether or not the car 8 has arrived at a destination may be determined based on whether or not the position information of the car 8 indicates that the car 8 is within a predetermined distance from a destination and/or the car 8 is driving on a link contacting with an entrance of a destination. When the destination determining unit 31 determines that the car 8 has arrived at a destination, the destination determining unit 31 sends a result of this determination to the entry determining unit 32.

When it is determined that the car 8 has arrived at a destination, the entry determining unit 32 determines whether the car 8 can be parked (enter) in a parking lot. As described above, the determination is made based on whether a blocking object 60 has been detected or not by using image data or a radar sensor. That is, when a car 8 is about to enter a destination, if the car 8 cannot enter the destination because of a blocking object 60, the entry determining unit 32 determines that the car 8 cannot park in a parking lot. When the entry determining unit 32 determines that the car 8 cannot be parked in a parking lot, the entry determining unit 32 issues a request for resetting a destination to the destination setting unit 34, and sends a notification to the parking lot information transmitting unit 39, indicating that a parking lot is not available.

The entry determining unit 32 includes a character recognition unit 33. The character recognition unit 33 applies a kind of image processing called OCR (Optical Character Recognition), to recognize characters. In a case in which a character string is written on a signboard, the character recognition unit 33 recognizes the character string and analyses a meaning of the character string. For example, when a string "no parking" is present, by using morphological analysis, the character recognition unit 33 recognizes that parking is not available based on an extracted word "no". Thus, the entry determining unit 32 can determine with certainty that the car 8 cannot be parked in a parking lot. The entry determining unit 32 may utilize information extracted by the character recognition unit 33 supplementally. For example, if a blocking object 60 is detected at a parking lot but there is a space in which the car 8 can enter, the entry determining unit 32 can determine that the car 8 cannot be parked in the parking lot based on a result of the character recognition.

The character recognition unit 33 can also extract a parking unavailable period (from when until when a parking lot is unavailable). The character recognition unit 33 may also extract a period when parking is available. For example, from a sentence "parking is unavailable until 20:00", the character recognition unit 33 may extract a parking unavailable period of "until 20:00". In another example, from a sentence "parking is unavailable from October 1 to December 5", the character recognition unit 33 may extract a parking unavailable period of "until December 5". As will be described below, a parking unavailable period is transmitted to the road map server 50, with parking lot unavailability information indicating that a car cannot be parked in a parking lot.

The parking lot information transmitting unit 39 sends, to the road map server 50, a notification indicating that a parking lot is not available. Specifically, location information of a parking lot and information indicating that the parking lot is not available are sent (facility ID may also be used instead of the location information). In a case in which a parking unavailable period has been extracted, this information is also sent. By sending the above information, the fact that the parking lot indicated by the information is unavailable is registered in the road map server 50, and cars other than the car 8, which are trying to use the same parking lot as the car 8, can set another available parking lot as their destination, without setting the unavailable parking lot as a destination.

The destination setting unit 34 resets a destination based on a target facility, by referring to the road map DB 15. Resetting of a destination will be described below with reference to FIGS. 6A to 6C. The destination setting unit 34 may inquire of the road map server 50 a parking lot in a vicinity of a destination whose parking lot is unavailable. Before resetting a destination, the destination setting unit 34 may ask a driver whether or not to perform the resetting. In the following, a destination determined by the resetting operation will be referred to as an alternate destination. Specifically, in the present embodiment, an alternate destination means a parking lot in which the car 8 was actually parked, and if the car 8 is not actually parked in a parking lot having been determined by the resetting operation, the parking lot should not be referred to as an alternate destination. However, for ease of explanation, a description of the present embodiment will be made based on a premise that the car 8 will with certainty be parked in a destination determined by the resetting operation. Therefore, regardless of whether the car 8 is actually parked in a destination determined by the resetting operation, a destination determined by the resetting operation will be referred to as an alternate destination.

In a case in which the destination setting unit 34 may ask a driver whether or not the resetting is to be performed before resetting a destination, the display unit/operation reception unit 37 displays a message such as "Request alternate destination?" on the display 17, and receives an answer from the driver.

The parking determining unit 35 determines whether the car 8 has been parked in the destination which had been reset by the destination setting unit 34, or in a parking lot near an original parking lot which had been determined to be unavailable. For example, whether the car 8 has been parked or not may be determined based on at least one of the following events: an event that a parking brake is set, an event that speed of a car is reduced to zero or less than a velocity close to zero, an event that a gearlever is shifted to a P (parking) position, and an event that an ignition is turned off.

When the parking determining unit 35 determines that the car 8 has been parked, the alternate destination transmitting unit 36 reports an alternate destination (information representing an alternate destination) to the road map server 50. Any information may be used as the information representing an alternate destination. For example, position information or a facility ID may be used as the information representing an alternate destination. Although, as described above, a driver may park the car 8 in a location different from a destination set by the destination setting unit 34, in this case, a place in which the car 8 has actually been parked may be determined as an alternate destination.

<<Road Map Server>>

The road map server 50 includes the following functional elements: an information reception unit 51, a facility information registration unit 52, an availability determining unit 53, a facility information providing unit 54, and a facility information DB 55. These functional elements are embodied by a CPU in the road map server 50 executing a program, to interoperate with hardware elements in the road map server 50. Part or all of the functional elements may be implemented by hardware, such as an IC.

The information reception unit 51 receives information identifying a parking lot, the parking lot unavailability information, and a reason for unavailability. In a case in which a parking unavailable period has been found, information about the parking unavailable period is also received by the information reception unit 51. In addition, in a case in which the car 8 has been parked in an alternate location, information indicating the alternate location is also received by the information reception unit 51. The information reception unit 51 sends the above information to the facility information registration unit 52. The facility information registration unit 52 registers the parking lot unavailability information, the reason for unavailability, the parking unavailable period, and the alternate destination, with the facility information DB 55, in a state associated with a facility. Details of the facility information DB 55 will be described below with reference to Table 1.

When the car 8 (which is about to start, or which is finding a route) sets a destination, the availability determining unit 53 determines whether the destination is available or not (that is, whether the car 8 can be parked in the destination or not), by referring to the facility information DB 55. If the destination is associated with an alternate destination in the facility information DB 55, the availability determining unit 53 proposes the alternate destination to a driver of the car 8.

The facility information providing unit 54 receives, from the car 8, an inquiry as to whether the car 8 can park in a destination or not. The facility information providing unit 54 also transmits availability of a parking lot determined by the availability determining unit 53. Further, if an alternate destination is found, the facility information providing unit 54 transmits the alternate destination to the navigation device 10.

TABLE 1 facility information table

| FACILITY ID | COORDINATES (LATITUDE, LONGITUDE) | CATEGORY | AVAILABILITY | REASON | ALTERNATE DESTINATION |
|---|---|---|---|---|---|
| 001 | X1, Y1 | Parking lot | True until 20:00 | Prohibited entry | 091 |
| 002 | X2, Y2 | Convenience store | False | — | — |
| 003 | X3, Y3 | Parking lot | True | Full | — |
| ... | ... | ... | ... | ... | ... |

Table 1 is an example of information managed in the facility information DB 55. The information will be referred to as a facility information table. In the facility information table, items of coordinates, a category, availability, a reason, and an alternate destination, are stored associated with a facility ID. The facility ID is information for specifying (or identifying) a facility such as a parking lot (note that "ID" stands for "identifier"). The coordinates represents a location of a facility by longitude and latitude. An address may be stored in the facility information DB 55 instead of coordinates (an address and coordinates are interchangeable). The category represents a type of a facility. In the present embodiment, "parking lot" or "convenience store" is stored as a category. In the column of availability, information indicating whether or not a facility is available is stored. "True" means that a facility is available, and "False" means that a facility is unavailable. In an initial state, "True" is stored in this column. When "False" is stored in the column of availability, a reason that a facility is unavailable is stored in the column of reason. For example, "prohibited entry" or "full" is stored. The column of alternate destination represents a facility ID of a parking lot (alternate parking lot) where a driver actually parked his/her car when the driver was not able to park his/her car in an original parking lot P0 determined as a destination at first. Instead of a facility ID, coordinates may be stored in the column of alternate destination.

<Resetting Destination>

Figure 6B:
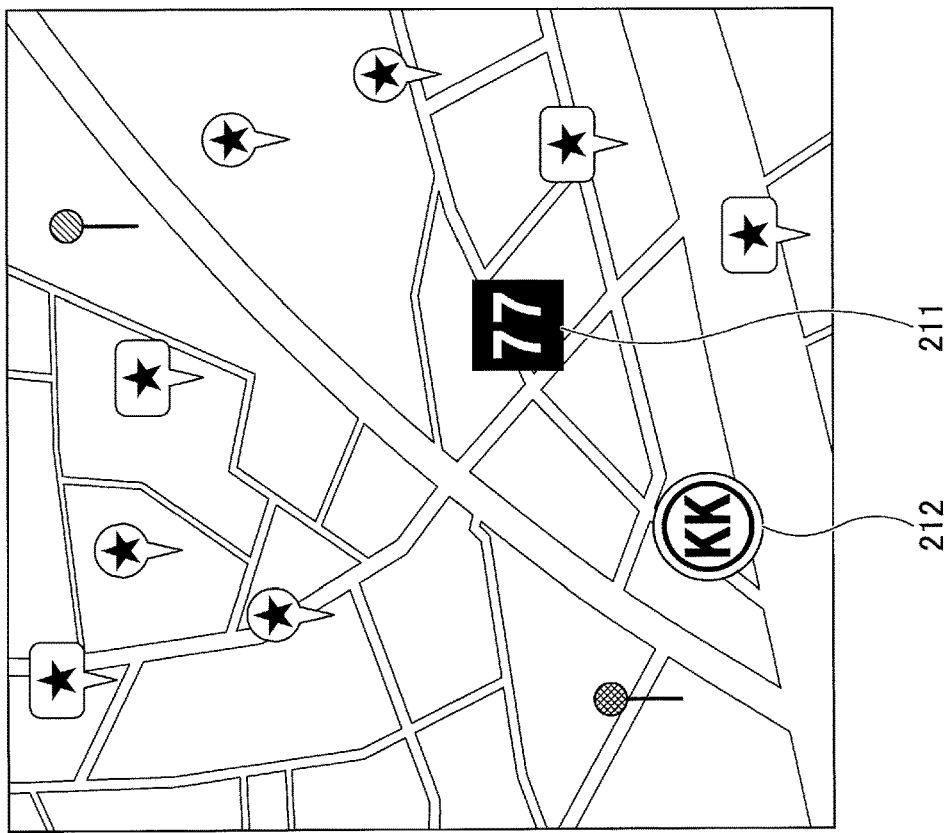
FIGS. 6A to 6C are diagrams illustrating examples of maps of a destination and its vicinity.
Figure 6A:
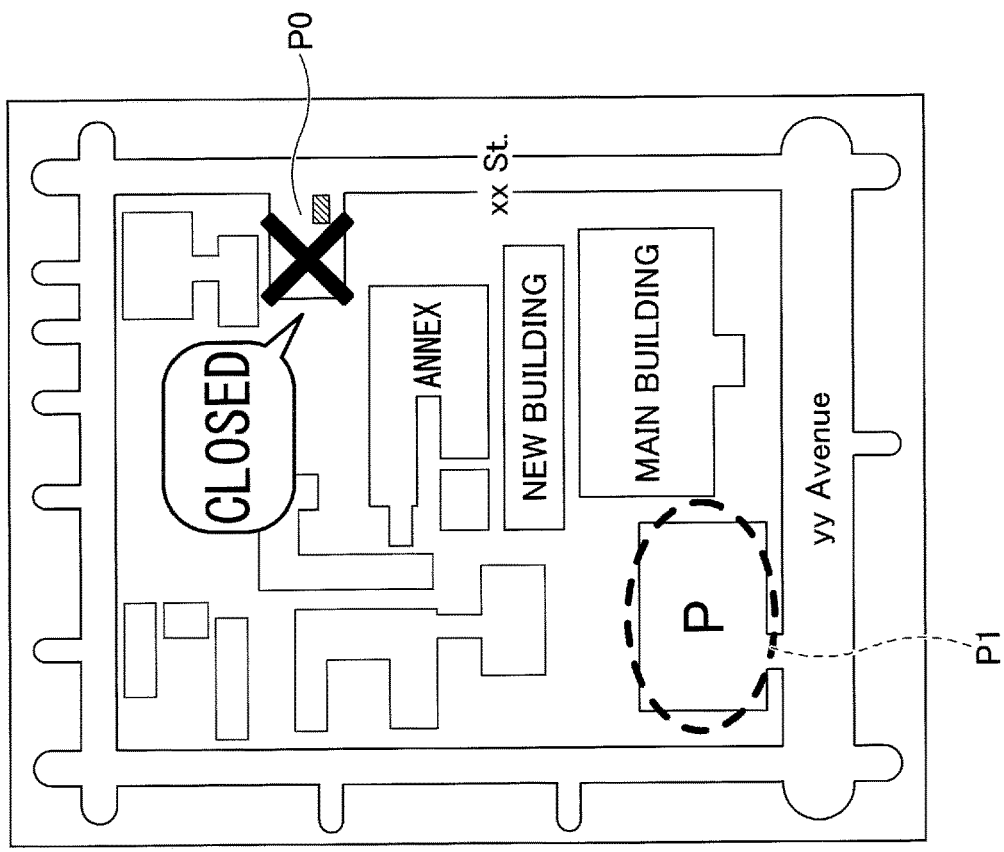
Figure 6C:
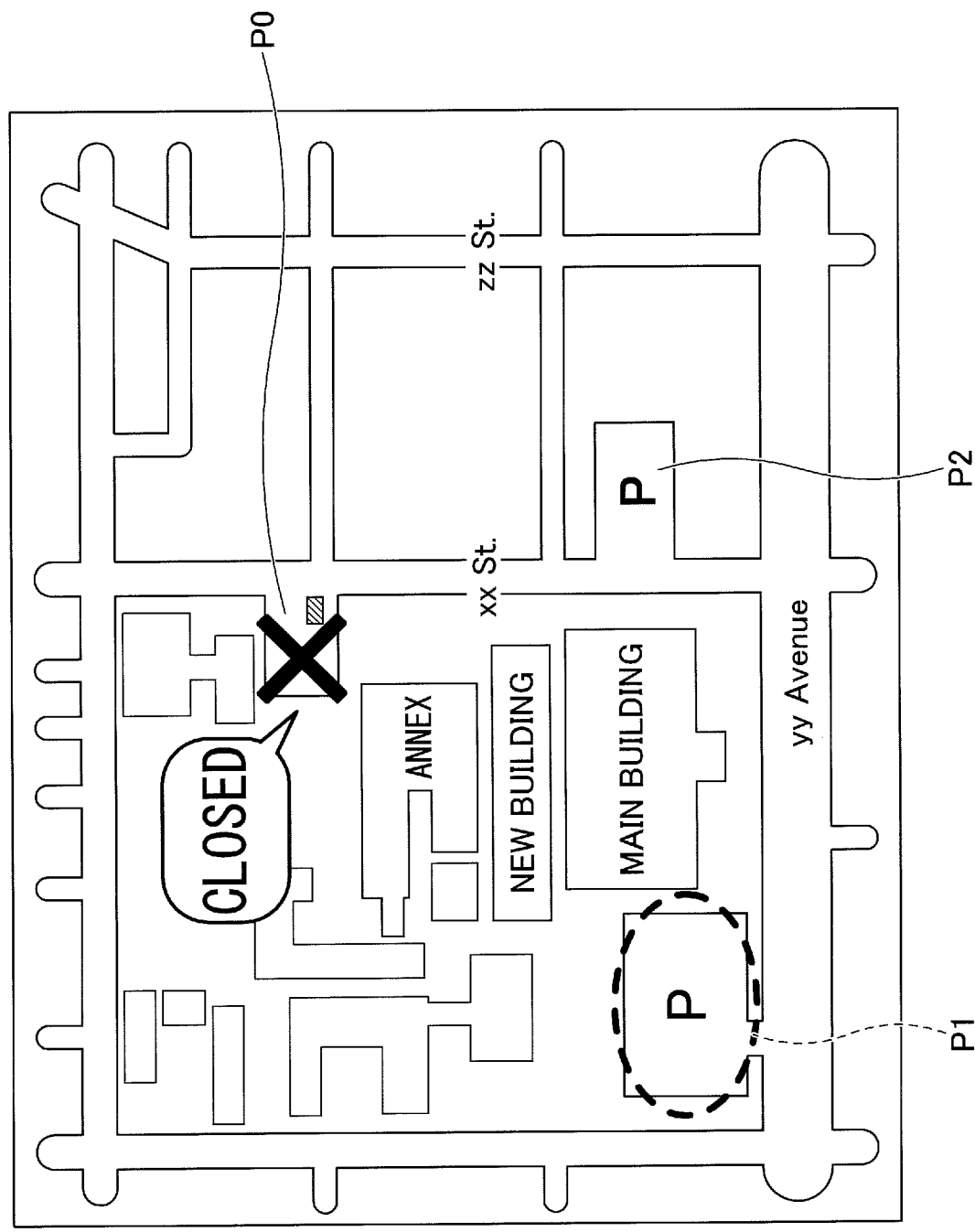

A destination resetting operation will be described with reference to FIGS. 6A to 6C. If an alternate destination is registered with the facility information DB 55, the alternate destination is likely to be chosen as a destination when resetting a destination (when setting a destination again). Thus, generally, an operation to be described according to FIGS. 6A to 6C is performed when an alternate destination is registered with the facility information DB 55. However, the operation may be performed when a driver desires to choose, as a destination, a place other than the (registered) alternate destination.

FIG. 6A is an example of an electronic map of a target facility and its vicinity. In FIG. 6A, P0 is a parking lot which was set as a destination at first. In a case in which the car 8 cannot be parked in the parking lot P0, if the navigation device 10 guides the car 8 (a driver of the car 8) to another parking lot P1 located in the same target facility, a walking distance of the driver can be shortened. Therefore, if there is another parking lot (P1 in a case of FIG. 6A) other than the parking lot P0 associated with the target facility in the road map DB 15, the destination setting unit 34 sets the parking lot P1 as a destination.

In a case in which a target facility is of small scale such that the target facility and a parking lot for the target facility are treated (regarded) as the same facility, the destination setting unit 34 sets a facility belonging to the same category as the original target facility as a destination. In FIG. 6B, a facility 211 is a parking lot (target facility) which is set as a destination (original destination) at first. The destination setting unit 34 sets (resets), as a destination, a facility 212 which is the closest facility belonging to the same category as the facility 211. If the destination setting unit 34 has information of a brand of a facility belonging to the same category as the facility 211 (original target facility) which is frequently visited by a driver (preferred by a driver), the destination setting unit 34 may choose a facility of the brand preferred by the driver as a destination, rather than the closest facility.

As in the case of FIG. 6A, in a case in which multiple parking lots are present in a target facility, one of the parking lots in the target facility may be chosen. However, a parking lot which is closest to the unavailable parking lot P0 may be chosen even if the parking lot is not in the target facility. For example, in a case illustrated in FIG. 6C, a parking lot P2 which is closest to a parking lot P0 may be chosen. As the parking lot P2 is close to both the target facility and the parking lot P0, a driver can quickly park the car 8 and visit the target facility.

<When Parking Lot is Full>

There may be a case in which a parking lot is unavailable, not because a car would hit the blocking object 60 but because the parking lot is full. The navigation device 10 according to the present embodiment is also applicable to this case. That is, another destination can be chosen. In most parking lots, information indicating that a parking lot is full is displayed at an entrance of the parking lot.

Figure 7:
FIG. 7 illustrates an example of a display at an entrance of a parking lot, on which a sign of "Full" is displayed.

FIG. 7 illustrates an example of a display at an entrance of a parking lot, on which a sign 213 of "Full" is displayed. Because the character recognition unit 33 recognizes such displayed contents, the navigation device 10 can determine that the parking lot is unavailable because the parking lot is full. Alternatively, a state that a parking lot is full may be detected by using near-field communication technology or vehicle-to-roadside communication technology. Further, when an attendant of a parking lot is standing at an entrance of the parking lot because the parking lot is full, the attendant is detected by an analysis of image data or by a radar sensor, and a determination is made that a blocking object 60 has been detected. Thus, the entry determining unit 32 can determine that the parking lot is unavailable.

There may be a case in which full/vacancy information of a parking lot is delivered to the car 8 which is at a distant location from the parking lot. In this case, because the car 8 can detect in advance that the parking lot is full, the present embodiment is less likely to be applied to this case.

<Operating Procedure>

Figure 8:
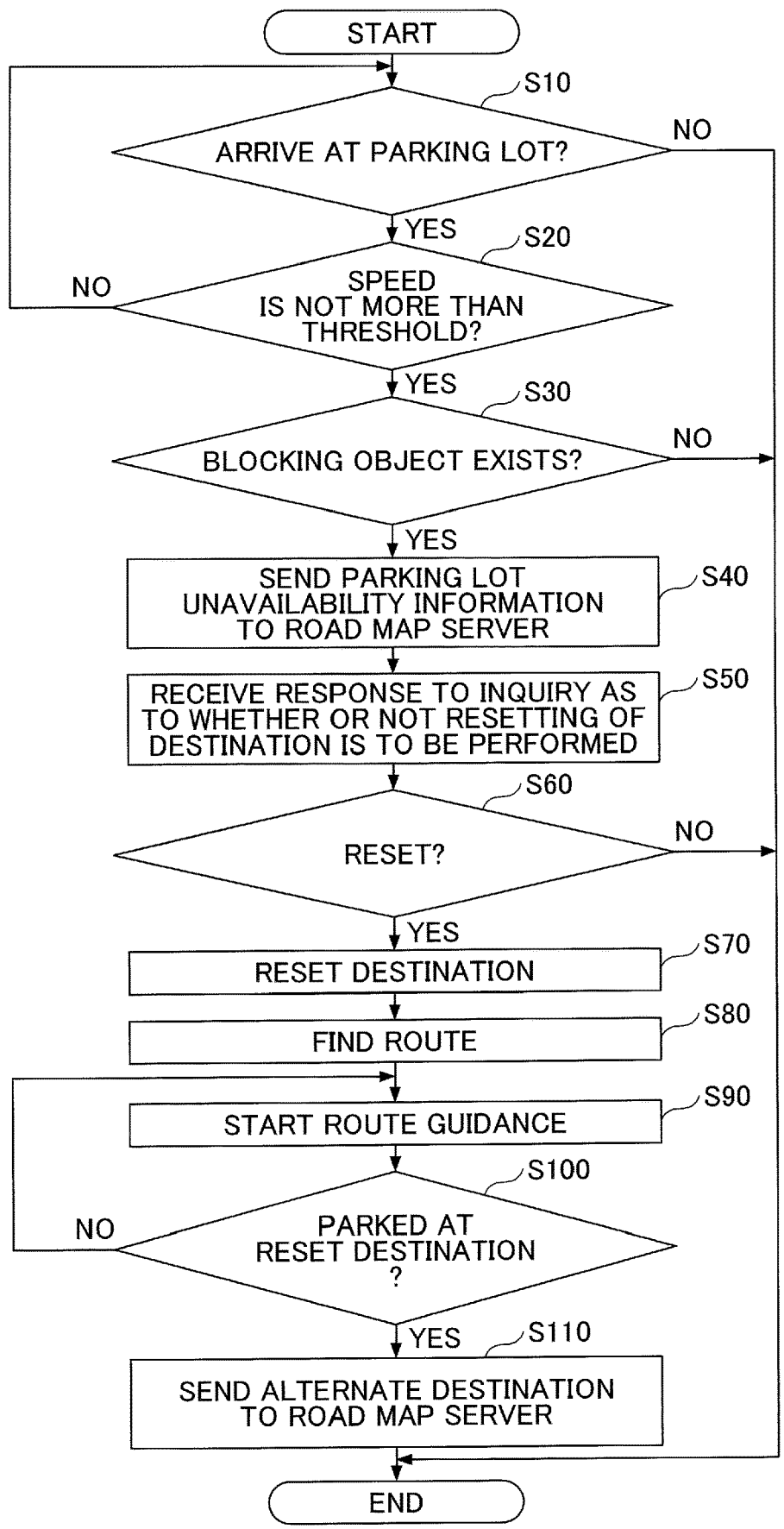
FIG. 8 is a flowchart illustrating an example of a flow of operations when the navigation device guides a driver to a destination.

FIG. 8 is a flowchart illustrating an example of a flow of operations when the navigation device 10 guides a driver to a destination. The operations in FIG. 8 may be executed repeatedly while the navigation device 10 is guiding a driver to a destination. Alternatively, the operations may be started when the car 8 has approached within a predetermined distance from a destination.

The destination determining unit 31 in the navigation device 10 determines whether the car 8 has arrived at a parking lot as a destination (S10). If it is determined that the car 8 has arrived at the parking lot, the destination determining unit 31 further determines whether speed of the car 8 is not more than a threshold (S20). Speed of a car is generally reduced when the car enters a parking lot from a road. Thus, by performing this determination (S20), the destination determining unit 31 determines with certainty that, when a blocking object 60 is detected, the blocking object 60 is related to the parking lot of the destination. If the determination at S20 is negative (S20: NO), the destination determining unit 31 executes step S10 again.

If the determination at S20 is affirmative (S20: YES), the entry determining unit 32 determines whether a blocking object 60 has been detected or not (S30). That is, whether or not a signboard, a fence for construction, a traffic cone, or a character string displayed at an entrance of the parking lot indicating that the parking lot is full, is detected is determined. If the determination at S30 is negative (S30: NO), the process terminates. In this case, a driver of the car 8 is likely to park the car 8 in the parking lot of the destination. If the driver does not park the car 8, the navigation device 10 may restart the process from the beginning (S10).

If the determination at S30 is affirmative (S30: YES), the parking lot information transmitting unit 39 sends parking lot unavailability information to the road map server 50 (S40). In a case in which a parking unavailable period has been detected, the parking unavailable period is also sent. The information reception unit 51 in the road map server 50 receives information indicating that the parking lot is unavailable, a reason for unavailability, and a parking unavailable period (if any), and the facility information registration unit 52 registers the received information with the facility information DB 55, in association with each other.

Figure 9:
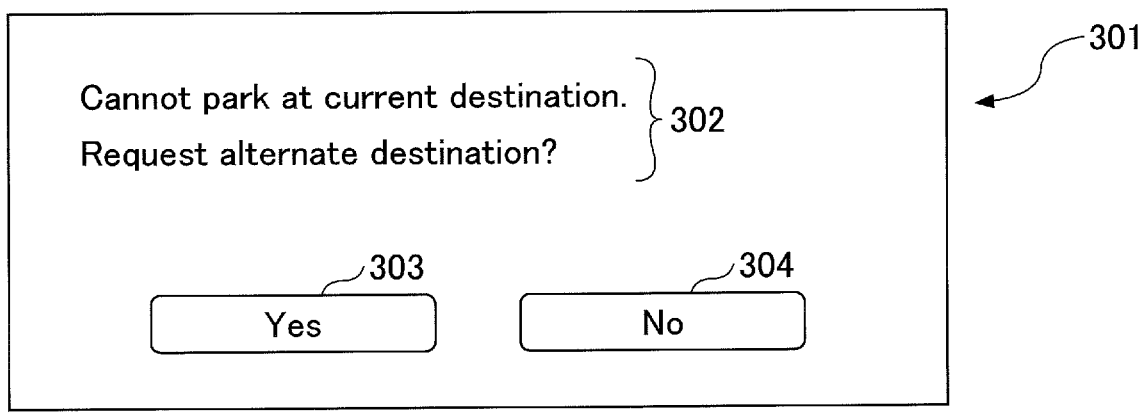
FIG. 9 illustrates an example of an inquiry screen displayed on a display of the navigation device.

Next, the display unit/operation reception unit 37 displays a message such as "Request alternate destination?" on the display 17, and receives an answer from the driver (S50). An example of the message displayed on a screen is illustrated in FIG. 9. Note that the message may be displayed on the HUD 21, or may be output as audio information through the speaker 19.

The destination setting unit 34 determines whether the driver answered that the driver desires resetting (S60). If the determination at step S60 is negative (S60: NO), the process in FIG. 8 terminates because, in this case, it is assumed that the driver will find an alternate parking lot by himself/herself. In a case in which the driver parks the car 8 in a certain place without resetting of a destination being performed by the destination setting unit 34, the place is not necessarily related to a target facility. Thus, the place is not registered as an alternate destination. However, the facility information registration unit 52 may determine whether or not a distance from the place to the target facility is within a threshold, and may register the place as an alternate destination if the distance is within the threshold. By the operation being performed, an alternate destination found by a driver can be registered.

If the determination at step S60 is affirmative (S60: YES), the destination setting unit 34 resets a destination (S70). That is, the destination setting unit 34 makes an inquiry to the road map server 50. If an alternate destination is registered with the facility information DB 55, the destination setting unit 34 resets a destination by using the alternate destination. If an alternate destination is not with the facility information DB 55, resetting a destination is performed as described above with reference to FIG. 6. Subsequently, the navigation device 10 finds a route to the alternate destination (a destination determined by the resetting operation at S70) (S80), and starts route guidance (S90).

When the route guidance is started, the parking determining unit 35 determines whether or not the car 8 has been parked in an alternate destination (S100). Note that the alternate destination mentioned here is not limited to the destination determined at step S70, and the alternate destination mentioned here may be a parking lot which was found by the driver and in which the car 8 was parked. However, the navigation device 10 may preferably determine whether or not the alternate destination mentioned here is within a predetermined distance from the target facility or from the original parking lot (original destination). By performing the determination, an alternate destination found by the driver can be registered.

In a case in which the car 8 has been parked in the alternate destination, the alternate destination can be an alternate parking lot to the original parking lot. Thus, the alternate destination is sent to the road map server 50 (S110). In order to determine a facility (stored in the facility information DB 55) with which the alternate destination should be associated, a facility ID or coordinates of the original destination (facility) may be sent. Alternatively, at step S40 or step S110, position of the car 8 may be sent.

Additional explanation is provided with respect to the process in FIG. 8. When parking lot unavailability information about a certain parking lot is sent to the road map server 50 at step S40, the information indicating that the parking lot is unavailable is registered with the facility information DB. However, after the information indicating that the parking lot is unavailable is registered with the facility information DB, if the road map server 50 receives information indicating that a car (any car other than the car 8) is parked in the parking lot, contents of the facility information DB regarding the parking lot is updated such that the parking lot is available. Further, with respect to a parking lot whose parking unavailable period is registered in the facility information DB, even if no car enters and starts using the parking lot after the parking unavailable period elapses, the facility information DB may be updated to indicate that the parking lot is available.

<Example of Inquiry Screen>

FIG. 9 illustrates an example of an inquiry screen 301 displayed on the display 17 of the navigation device 10. The inquiry screen 301 includes a message 302 of "Cannot park at current destination. Request alternate destination?", a yes button 303, and a no button 304. After a driver recognizes the displayed message 302, the driver presses either the yes button 303 or the no button 304. As the driver also sees a status of a parking lot with his/her eyes, the driver can determine if the message displayed by the navigation device 10 is correct or not, and may choose an appropriate button based on his/her determination.

<Destination Change by Using Information in Facility Information DB>

Next, a process for changing a destination using the facility information DB 55, which is performed after the information indicating unavailability of a parking lot is registered, will be described. In a case in which an alternate destination is registered, a driver can choose whether or not the driver changes the alternate destination as a destination.

Figure 10:
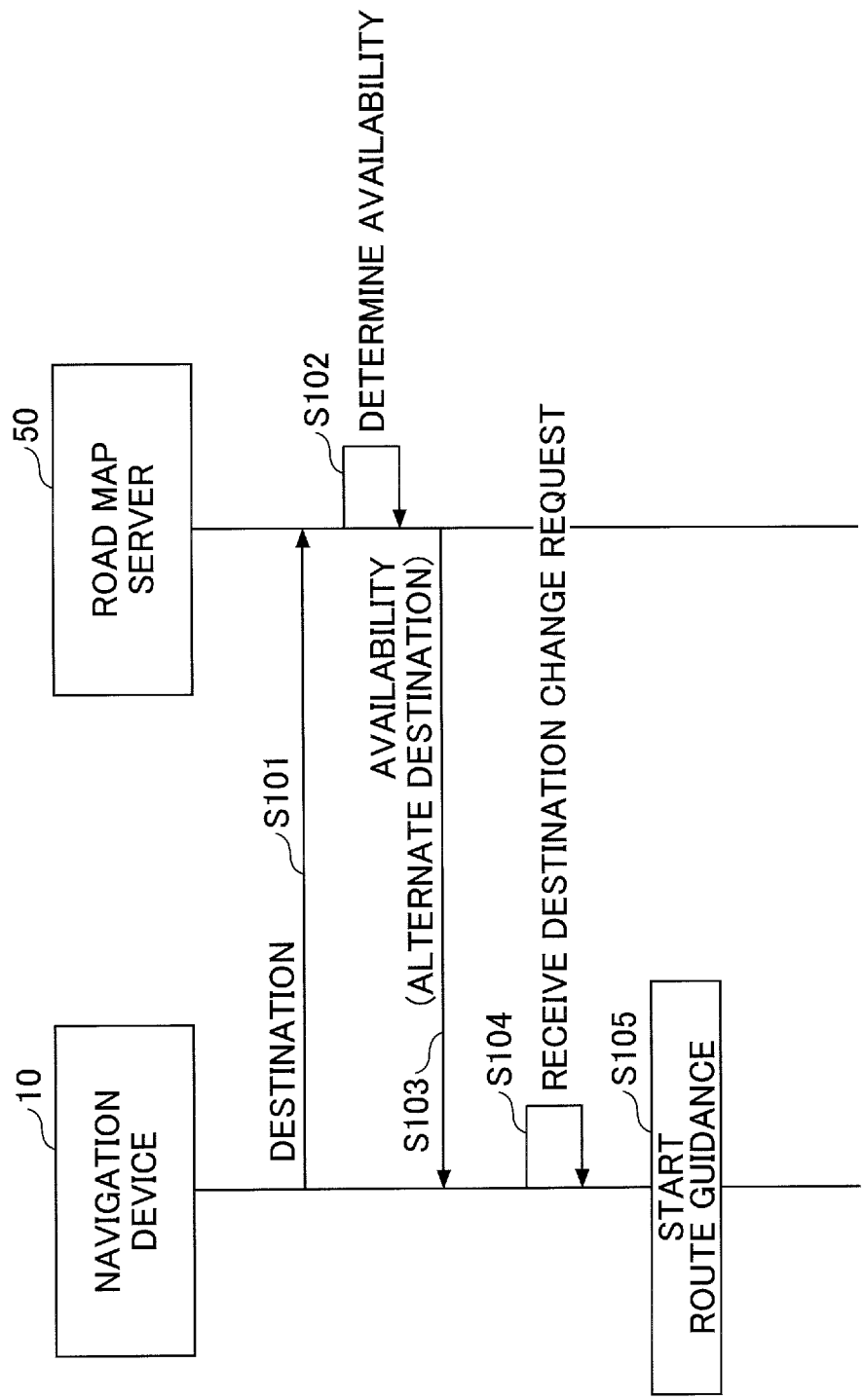
FIG. 10 is a sequence diagram illustrating an example of a scenario for changing a destination from a first destination set by a driver in the navigation device.

FIG. 10 is a sequence diagram illustrating an example of a scenario for changing a destination from a first destination (original destination) set by a driver in the navigation device 10. An operation illustrated in FIG. 10 starts just after a parking lot corresponding to a target facility is set to the navigation device 10 as a destination.

S101: The destination inquiry unit 38 in the navigation device 10 sends the destination set by the driver to the road map server 50. The destination is a parking lot chosen based on the target facility. The destination may be specified with either a facility ID or coordinates.

S102: When the facility information providing unit 54 in the road map server 50 receives the destination, the facility information providing unit 54 calls the availability determining unit 53 to cause the availability determining unit 53 to determine whether the car 8 can use the parking lot of the destination or not. Details of this process will be described below with reference to FIG. 11.

S103: The facility information providing unit 54 sends a response including availability of the parking lot of the destination to the navigation device 10. At this time, when an alternate destination is registered, the alternate destination is also sent. The destination inquiry unit 38 receives the answer from the road map server 50.

Figure 12A:
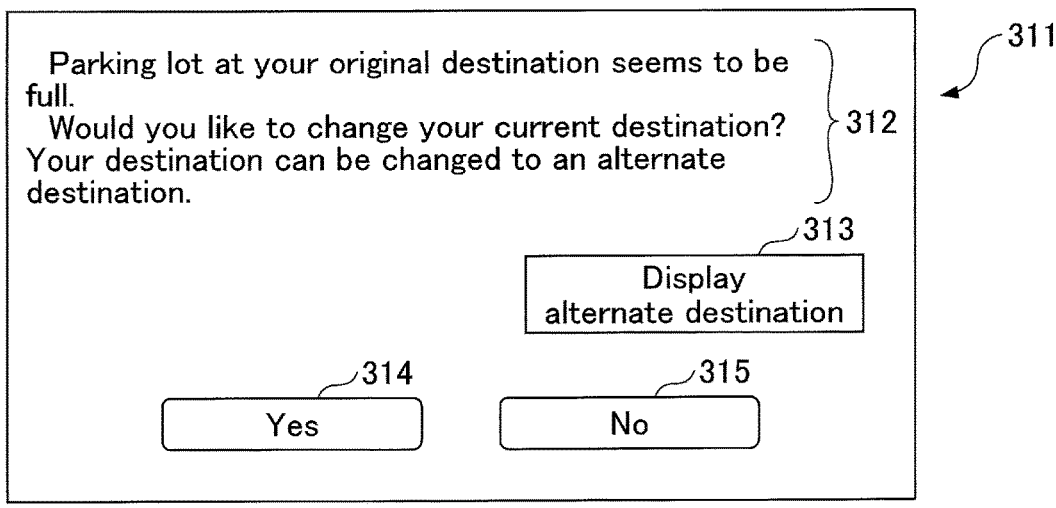
FIGS. 12A to 12C are diagrams illustrating examples of destination change request reception screens displayed on a display screen of the navigation device.
Figure 12B:
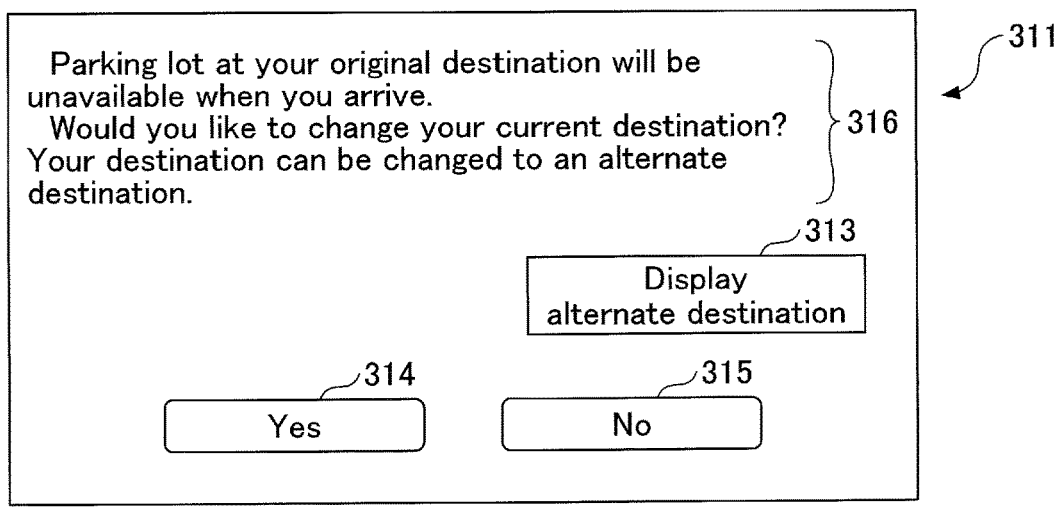
Figure 12C:
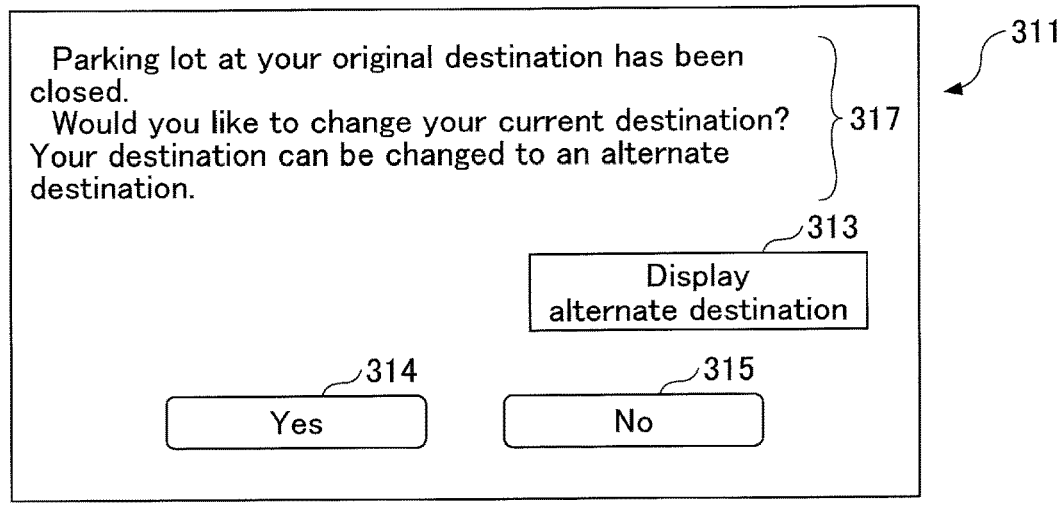

S104: The display unit/operation reception unit 37 in the navigation device 10 receives a destination change request from the driver, by displaying a message based on the availability of the parking lot. Examples of displayed messages are illustrated in FIGS. 12A to 12C.

S105: The destination setting unit 34 in the navigation device 10 changes a destination, and starts route guidance. Accordingly, because the car 8 can go toward a changed destination from the beginning (when the driver starts driving the car 8), the driver can avoid a problem in which the driver detects that a parking lot is unavailable when arriving at the parking lot and in which the driver must move to another parking lot.

FIG. 11 is a flowchart illustrating an example of a flow of operations when the road map server 50 determines availability of a destination parking lot.

The availability determining unit 53 in the road map server 50 searches the facility information DB 55 for information of a destination identified with a facility ID or coordinates (S201).

The availability determining unit 53 determines whether a parking lot of the destination is available or not (S202). If the parking lot is available, a driver does not need to change his/her destination. Thus, in this case, the facility information providing unit 54 sends a notification to the navigation device 10 that the parking lot is available (S209).

If the parking lot is not available, the availability determining unit 53 checks a reason why the parking lot is unavailable (S203). Next, the availability determining unit 53 determines if the reason is that the parking lot is full (S204). If the reason is that the parking lot is full, the facility information providing unit 54 sends a notification to the navigation device 10 that the car 8 may not be able to be parked in the parking lot because the parking lot is full (S208). In a case in which the parking lot is full, vacancy may occur in the parking lot at a time when the car 8 arrives at the destination. In a case in which an alternate destination is registered, the alternate destination is also sent.

If the reason is not because of the parking lot being full, the availability determining unit 53 checks the parking unavailable period of the parking lot (S205), and determines whether the parking lot is still unavailable when the car 8 will have arrived at the destination (parking lot) (S206). To make the determination at step S206, the availability determining unit 53 may use an estimated arrival time when the car 8 arrives at the destination.

If the parking lot is available when the car 8 arrives, the facility information providing unit 54 sends a notification to the navigation device 10 that the parking lot is available (S209).

If the parking lot is still unavailable when the car 8 arrives, the facility information providing unit 54 sends a notification to the navigation device 10 that the car 8 cannot be parked in the parking lot because the parking lot is in its unavailable period or because the parking lot has been closed (S207). In a case in which the parking unavailability period is present, the parking unavailability period is sent to the navigation device 10. Also, in a case in which an alternate destination is registered, the alternate destination is also sent.

As described above, when a parking lot of a destination is not available and an alternate destination of the destination is registered, the alternate destination is sent to the navigation device 10. Accordingly, it becomes easier for the driver to determine whether a destination should be changed from an original destination to an alternate destination.

<Receiving Destination Change Request>

Figure 13:
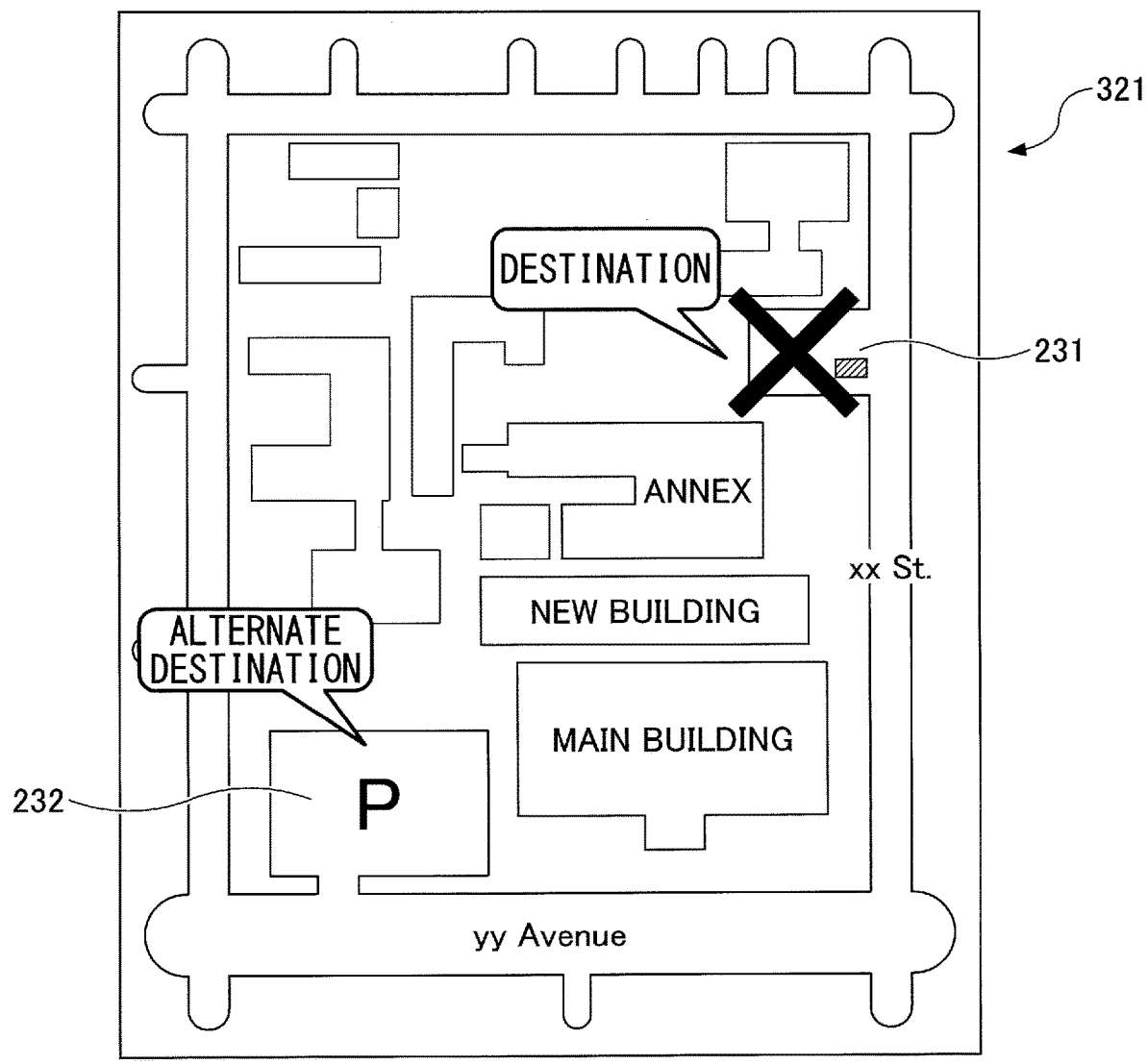
FIG. 13 illustrates an example of a destination display screen displayed on the display of the navigation device.

FIGS. 12A to 12C illustrate examples of a destination change request reception screen 311 displayed on the display 17 of the navigation device 10. FIG. 12A illustrates the destination change request reception screen 311 when it is determined that a parking lot is unavailable because the parking lot is full. The destination change request reception screen 311 includes a message 312 of "Parking lot at your original destination seems to be full. Would you like to change your current destination? Your destination can be changed to an alternate destination", a button 313 for displaying alternate destination, a yes button 314, and a no button 315. The button 313 is provided for a driver to instruct the navigation device 10 to display a location of an alternate destination on an electronic map, as illustrated in FIG. 13. The driver may change a destination in order to avoid with certainty occurrence of a situation in which resetting of a destination must be made after reaching an initial destination. Alternatively, the driver may choose not to change a destination based on his/her determination that vacancy occurs in a parking lot of a destination at a time when the car 8 arrives at the destination.

FIG. 12B illustrates the destination change request reception screen 311 when it is determined that the car 8 will arrive at a parking lot in a period when the parking lot is unavailable. Thus, a message 316 of "Parking lot at your original destination will be unavailable when you arrive. Would you like to change your current destination? Your destination can be changed to an alternate destination" is displayed.

FIG. 12C illustrates the destination change request reception screen 311 when it is determined that a parking lot is unavailable because the parking lot has been closed. Thus, a message 317 of "Parking lot at your original destination has been closed. Would you like to change your current destination? Your destination can be changed to an alternate destination" is displayed.

In both the destination change request reception screen 311 in FIG. 12B and the destination change request reception screen 311 in FIG. 12C, if an alternate destination is registered, the navigation device 10 can display a location of the alternate destination on an electronic map. Thus, it is easy for a driver to determine whether to change a destination or not. In a case in which an alternate destination is not registered, a message of "Alternate destination is set to your current destination" and the button 313 for displaying alternate destination are not displayed. In the case in which FIG. 12B is displayed, a driver can change a destination, for example for the current time only, while recognizing the fact the parking lot has not been closed. In the case in which FIG. 12C is displayed, a driver can determine that the parking lot cannot be used because the parking lot has been closed, and can change a destination.

FIG. 13 illustrates an example of a destination display screen 321 displayed on the display 17 of the navigation device 10. In the destination display screen 321, an original destination 231 and an alternate destination 232 are displayed noticeably. FIG. 13 illustrates a case in which a balloon is attached to each of the original destination 231 and the alternate destination 232. Alternatively, the original destination 231 and the alternate destination 232 may be displayed with higher brightness than other parts in a map, or may be displayed with blinking. Further, the original destination 231 and the alternate destination 232 may be displayed so as to be surrounded by a frame for emphasizing the original destination 231 and the alternate destination 232. By displaying the destination display screen 321, because a driver can recognize a distance from an original destination to an alternate destination, the driver can easily determine whether or not to change a destination to an alternate destination.

<Modified Example of Resetting Destination>

In resetting a destination, a driver may choose an alternate destination (alternate parking) by himself/herself.

Figure 14:
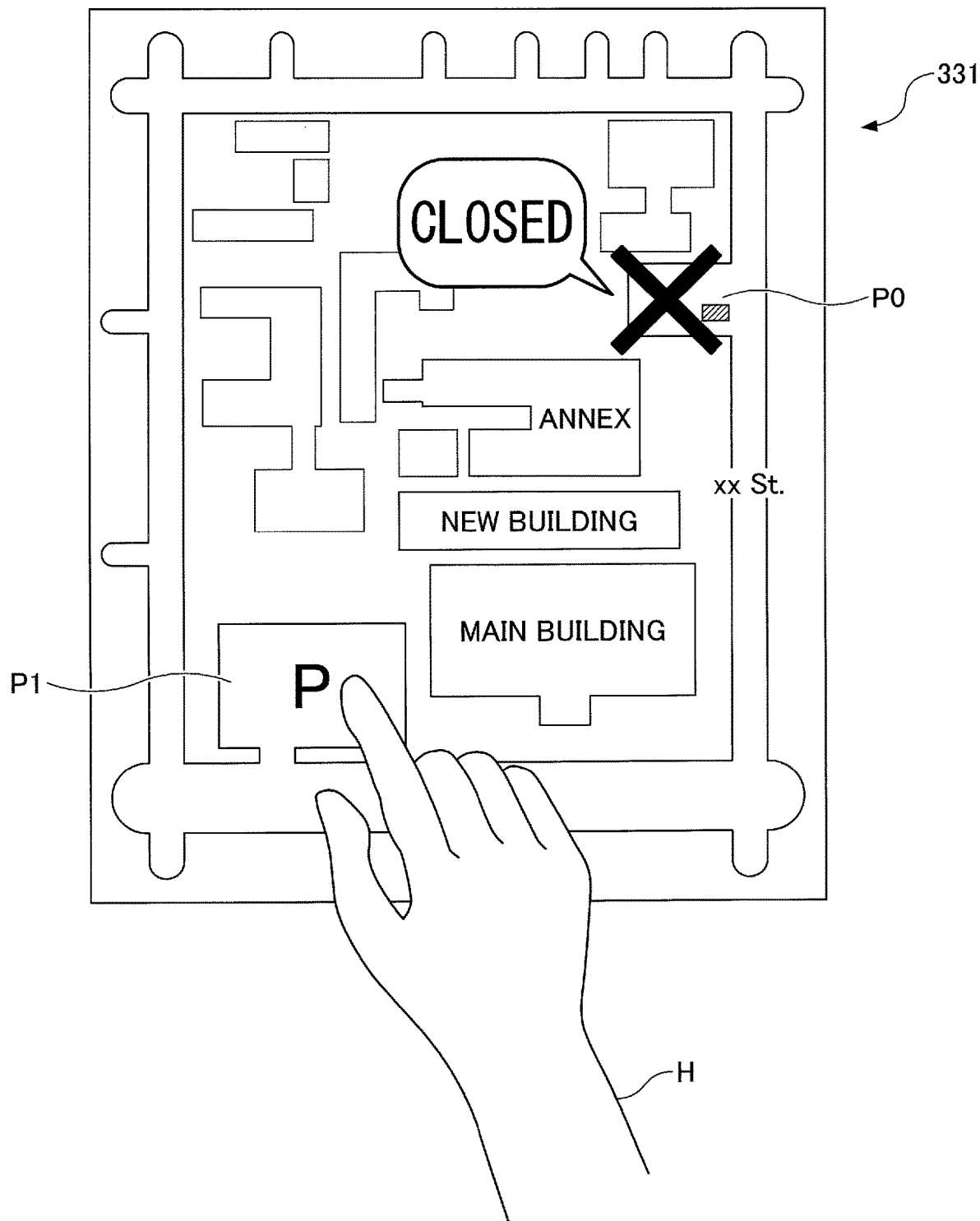
FIG. 14 illustrates an example of a destination resetting screen displayed on the display of the navigation device when resetting of a destination is performed.

FIG. 14 illustrates an example of a destination resetting screen 331 displayed on the display 17 of the navigation device 10 when resetting of a destination is performed. The display unit/operation reception unit 37 in the navigation device 10 displays, on the destination resetting screen 331, an electronic map of an area including an entire target facility, or preferably further including a surrounding area of the target facility. In a case in which a target facility is large, multiple parking lots may be provided. In this case, a driver finds another (alternate) parking lot by looking at the destination resetting screen 331, and taps the alternate parking lot on the screen 331 with his/her finger H. The display unit/operation reception unit 37 sends information of a location tapped by the driver to the destination setting unit 34. By performing the above described operation, a destination can be reset to be the alternate parking lot chosen by the driver.

Even in a case in which a parking lot is not explicitly displayed in an area of a target facility, a driver may be enabled to estimate a location of a parking lot and tap the location.

Summary

As described above, the navigation device 10 according to the present embodiment automatically detects that the car 8 cannot be parked in a parking lot configured as a destination, and resets a destination. Therefore, a driver can reach a destination with fewer operations. That is, according to the present embodiment, convenience and operability of the navigation device is improved. Further, after an alternate destination has been registered, a destination can be reset to be the alternate destination. In a case in which a driver requests to find a route to a facility with which an alternate destination is associated, a destination can be changed to the alternate destination. Thus, in this case, if a driver changes a destination from the beginning, a useless operation of going to an original destination before going to an alternate destination can be eliminated.

Second Embodiment

A second embodiment describes a case in which a navigation device 10 is installed in a car 8 and in which the car 8 travels to a destination on autonomous driving. A degree of automation of driving is expressed as a level of driving automation. At present, six levels from level 0 to 5 are defined. "Autonomous driving" mentioned in the present embodiment means that a car can autonomously travel to a parking lot alongside a public road. That is, a level of driving automation assumed in the present embodiment is level 3 or more.

At present, in autonomous driving technology, a case in which a car arriving at a destination by autonomous driving cannot be parked has not been considered. Thus, the car 8 may stop because of failure of an action plan of the autonomous driving. In another scenario, the car 8 may continue to search for an original parking lot (a parking lot initially chosen) near a destination, and thereby it may waste time before arriving at the destination. As the destination resetting function described in the first embodiment is capable of resetting a destination without a driver's intervention, the destination resetting function is suitable for the car 8 driven by autonomous driving.

<Autonomous Driving>

Figure 15:
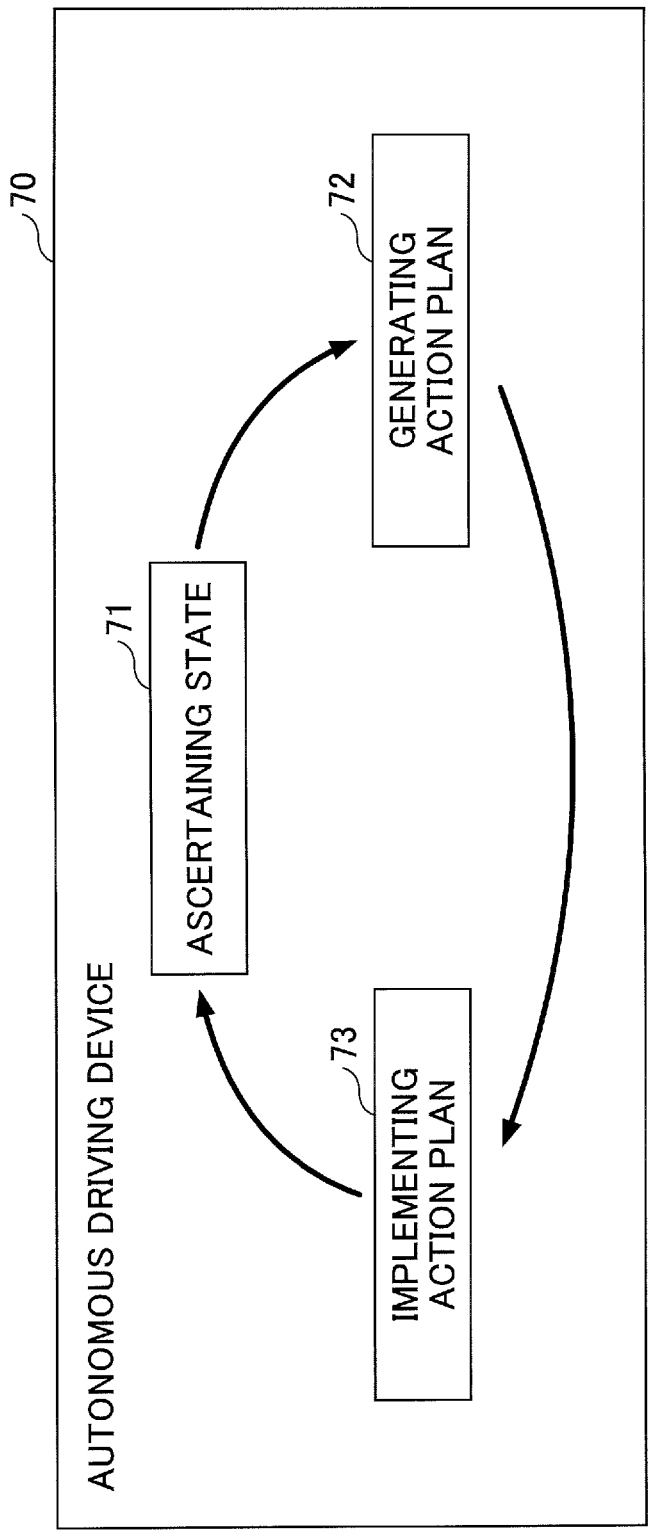
FIG. 15 is a diagram illustrating a concept of autonomous driving technology.

FIG. 15 is a diagram illustrating a concept of autonomous driving. Note that the diagram in FIG. 15 is merely an example since each developer is developing their own implementation method independently.

An autonomous driving device 70 repeats the following operations: ascertaining a state 71 (may also be referred to as "ascertaining 71"), generating an action plan 72 (may also be referred to as "generating 72"), and implementing the action plan 73 (may also be referred to as "implementing 73"). In the ascertaining 71, by using a dynamic map and various sensors, a position of a car (position information in a map (longitude, latitude, and altitude), and a lane where a car is positioned), velocity of a car, a moving direction of a car, acceleration of a car, angular velocity of a car, moving states (position, direction of movement, and velocity) of other objects such as other cars, bicycles, or pedestrians, states of signals, and the like, are detected. By the ascertaining 71, a virtual world close to the real world can be constructed. Note that the dynamic map is 3-dimensional map data of high-precision which is developed for the autonomous driving.

In the generating 72, an action plan in the virtual world is generated. Specifically, determination of a route to a destination, determination of a detailed driving path (a path to be traveled by car) based on states of obstacles, and determination of speed of a car are performed. As the detailed virtual world has already been generated, the driving path can be drawn in the virtual world as a single line.

In the implementing 73, steering, acceleration, and braking are controlled by a feedback control, such that a car can travel on the determined driving path at a determined speed. That is, in the implementing 73, control amounts of physical elements in order to realize the action plan are calculated, and actuators for the physical elements are controlled based on the control amounts.

By repeating the ascertaining 71, the generating 72, and the implementing 73, the autonomous driving device 70 travels to a destination.

<Difference from Manually Driving (1)>

In the present disclosure, elements to which the same reference symbols are assigned have substantially identical features. Thus, overlapping descriptions of the elements may be omitted, or only a different point of the elements may be described. In the destination guiding system 100 according to the present embodiment, the car 8 in the present embodiment differs from the car 8 in the first embodiment in that the car 8 in the present embodiment includes the functions of the autonomous driving device 70. Note that functions necessary for the autonomous driving are included in the autonomous driving device 70. Further, in the present embodiment, differences from the first embodiment will be mainly described.

When a car is driven by the autonomous driving (hereinafter, the car may be referred to as a self-driving car), a method of determining whether a parking lot is available or not is different from a car manually driven. Similar to the first embodiment, in a self-driving car, the entry determining unit 32 determines that a car cannot be parked in a parking lot by detecting a blocking object 60. However, the self-driving car may also make a determination based on the following two events:

(i) the self-driving car suddenly stopped near a parking lot,
(ii) even if the self-driving car has passed a parking lot, a parking lot of a destination cannot be detected.

In a case in which the self-driving car cannot find a parking lot of a destination, the self-driving car may make a sudden stop because of failure of an action plan. Thus, in this case, determination based on (i) can be used.

In a case in which a parking lot does not exist at coordinates corresponding to a destination, the self-driving car may continue driving to find a parking lot. Further, there may be a case in which a sudden stop is not preferable depending on a traffic state. Thus, in this case, determination based on (ii) can be used.

<Operating Procedure>

Figure 16:
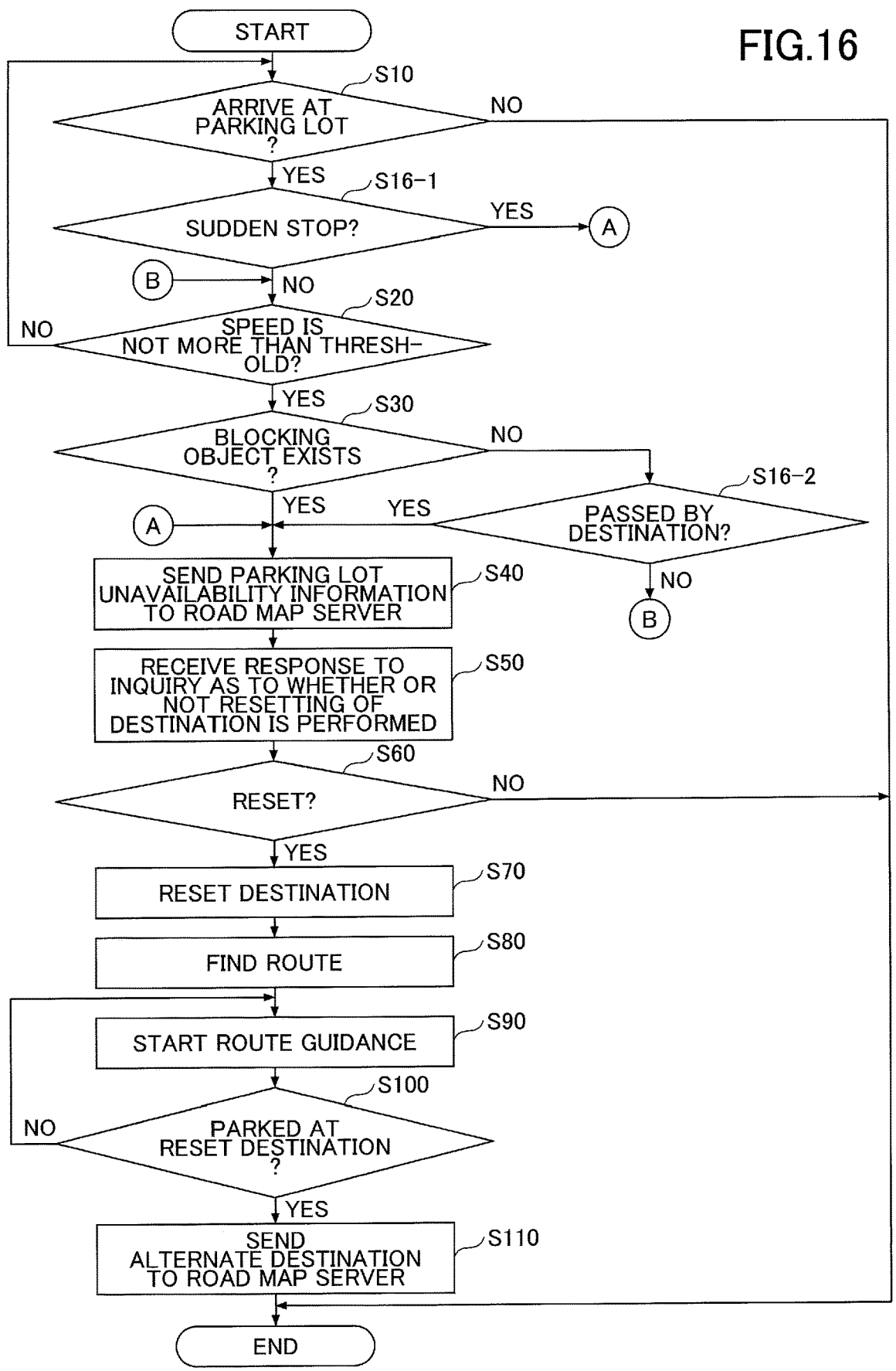
FIG. 16 is a flowchart illustrating an example of a flow of a process when the navigation device guides a driver to a destination.

FIG. 16 is a flowchart illustrating an example of a flow of a process when the navigation device 10 guides a driver to a destination. In the following, differences between FIG. 16 and FIG. 8 will be mainly described.

If it is determined that the car 8 has arrived at a parking lot, the entry determining unit 32 determines whether the car 8 has made a sudden stop or not (S16-1). If the car 8 has made a sudden stop, the process proceeds to step S40, and parking lot unavailability information is sent to the road map server 50.

Further, if, at step S30, it is determined that a blocking object 60 is not present, the entry determining unit 32 determines whether the car 8 has passed the destination or not, based on position information (S16-2). For example, considering an error of the position information of the car 8, the entry determining unit 32 may determine that the car 8 has passed the destination if the car 8 has moved away from the destination and the car 8 is several ten meters or more apart from the destination. If it is determined that the car 8 has not passed the destination, the process reverts to step S20. If it is determined that the car 8 has passed the destination, the process proceeds to step S40, and parking lot unavailability information is sent to the road map server 50. After step S40, similar operations to those described in the first embodiment may be performed.

As described above, in the self-driving car, various determination methods can be used for detecting that a parking lot is unavailable.

Further, after the car 8 (self-driving car) starts driving toward a destination (alternate destination) which is reset at step S70, if a parking lot is found before the car 8 reaches the alternate destination, the car 8 may be parked at the found parking lot. In order to detect a parking lot, a signboard displaying a "P" mark, as illustrated in FIG. 7, may be detected using an image recognition technique or the like. Detecting a logo or a trademark of a target facility is also an effective method. To find a parking lot to be parked, conditions, such as, a distance from a target facility being within a threshold, may also be used.

<Difference from Manually Driving (2)>

In a self-driving car, if a route to a destination does not exist in a road map, the self-driving car may reach the destination if a driver inputs a rough route to the self-driving car. Thus, flexibility of resetting a destination increases.

Figure 17:
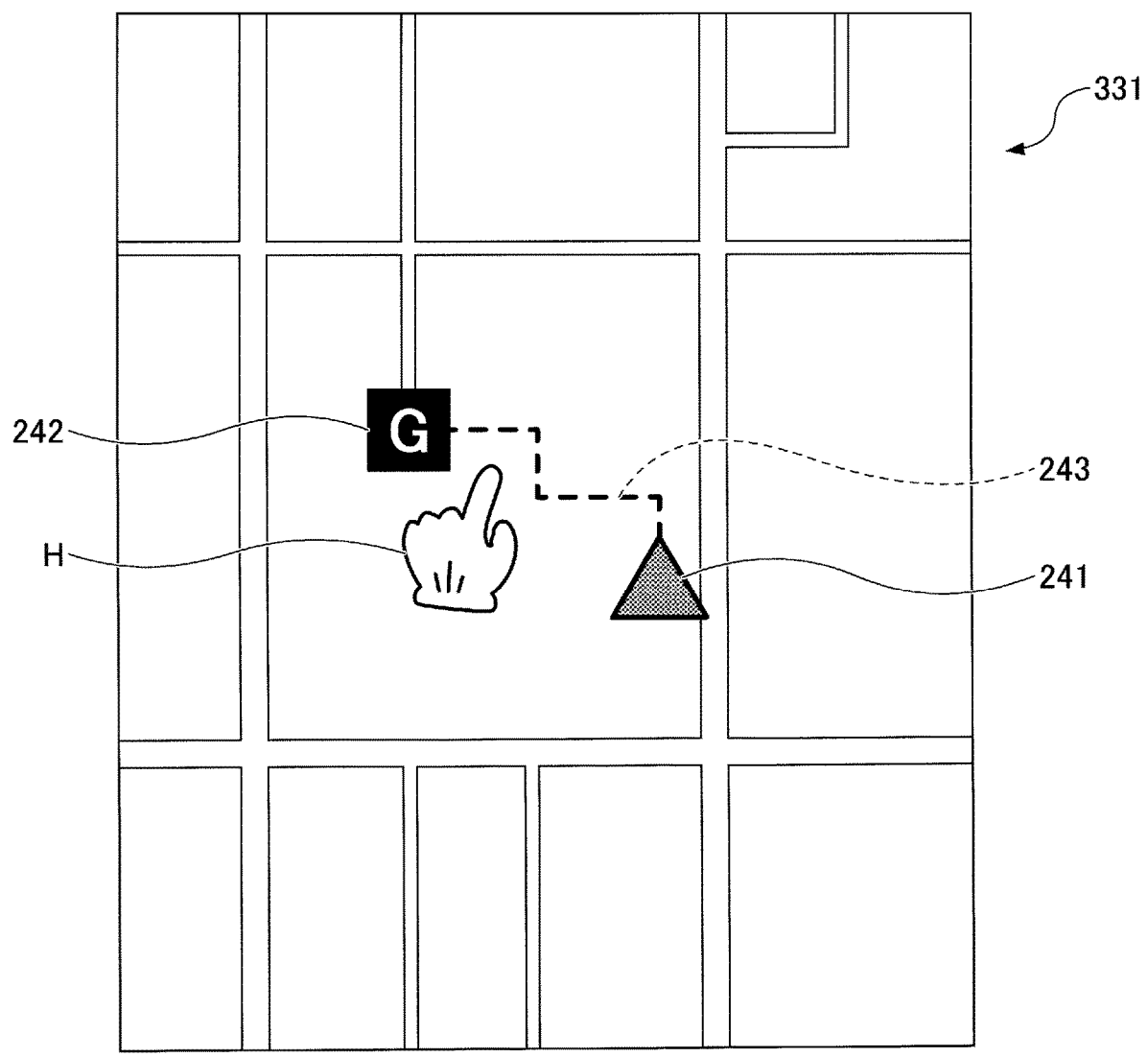
FIG. 17 illustrates an example of the destination resetting screen displayed on the display of the navigation device when resetting of a destination is performed.

FIG. 17 illustrates an example of the destination resetting screen 331 displayed on the display 17 of the navigation device 10 when resetting of a destination is performed. In the example illustrated in FIG. 17, because of an update delay of a road map, a route from a current position 241 of the car 8 to a destination 242 does not exist on the map in FIG. 17. However, in a case in which a location of the destination 242 is illustrated on a signboard or the like near the car 8, if a driver inputs the destination 242 and a route 243 to the autonomous driving device 70 in the car 8, the autonomous driving device 70 can automatically drive the car 8 to the destination 242. To input the route 243, the driver may draw the route 243 on the map with his/her finger H. The route 243 drawn with the finger H is not required to be accurate, because the autonomous driving device 70 drives the car 8 while avoiding obstacles, based on a detection result of surroundings of the car 8.

As described above, in a case in which the car 8 is driven by the autonomous driving device 70, flexibility of resetting a destination may increase.

Summary

As described above, according to the navigation device 10 in the present embodiment, in a case in which a car arrives at a destination but a parking lot of the destination is unavailable, a destination can be reset to be another parking lot and the car can be driven to the reset destination without a driver's intervention (or with minimum intervention of the driver).

<Other Suitable Applications>

Although the embodiments of the present invention have been described above, the present invention is not limited to the specific embodiments described above. Various changes or enhancements can be made hereto within the scope of the present invention.

When resetting a destination, a destination may be reset back to a parking lot that has been determined as unavailable. This is useful when a location of a parking lot is not changed but a location of an entrance has been changed, or when the entry determining unit 32 incorrectly detects a blocking object 60. In this case, a user may set the parking lot that had been determined as unavailable to be the destination.

Further, as the examples of configurations such as FIG. 5 are illustrated to facilitate understanding of the navigation device 10 and the road map server 50, the present invention is not limited by a way of dividing functional units, or not limited by names of functions. Functions of the navigation device 10 and the road map server 50 may be divided into more functional blocks, depending on contents of functions.

Alternatively, a functional block in the navigation device 10 or the road map server 50 may be configured to include multiple types of functions.

The GPS receiver 13 is an example of a position detecting means (unit), the destination determining unit 31 is an example of a first determining means (unit), the entry determining unit 32 is an example of a second determining means (unit), the destination setting unit 34 is an example of a destination setting means (unit), the parking lot information transmitting unit 39 is an example of a transmitting means (unit), the destination inquiry unit 38 is an example of an inquiry means (unit), the alternate destination transmitting unit 36 is an example of a parking position transmitting means (unit), the display unit/operation reception unit 37 is an example of a receiving means (unit), and the character recognition unit 33 is an example of a recognizing means (unit).

What is claimed is:

1. A navigation device for guiding a moving body to a destination, the navigation device comprising:
    an image capturing device;
    a position detecting device configured to detect a position of the moving body; and
    circuitry configured
    to determine whether or not the moving body has arrived at the destination based on the position detected by the position detecting device; and
    in response to the determination that the moving body has arrived at the destination,
        to detect an object provided at an entrance of the destination from an image captured by the image capturing device;
        to detect whether a character string representing prohibition of entry into the destination is written on the object by performing a character recognition of the image captured by the image capturing device, in order to determine whether or not the destination can be entered;
        in response to the character string representing prohibition of entry into the destination being detected,
            to display a message indicating that the destination cannot be entered, to choose an alternate destination; and
        in response to the character string representing prohibition of entry into the destination not being detected,
            to skip displaying the message indicating that the destination cannot be entered and to skip choosing the alternate destination,
    wherein the circuitry is further configured,
        to transmit, to an information processing apparatus via a network, information indicating that the destination cannot be entered, in response to the recognized character written on the object representing prohibition of entry into the destination;
        to receive an input of a destination from a driver of the moving body;
        to make an inquiry, to an information processing apparatus, on whether or not the destination can be entered;
        to receive a response to the inquiry from the information processing apparatus; and
        to change the destination, in a case in which the response to the inquiry received from the information processing apparatus indicates that the destination cannot be entered.

2. The navigation device according to claim 1, wherein
    the moving body includes an autonomous driving device configured to generate an action plan while ascertaining surroundings of the moving body and to drive the moving body to the destination, and
    the navigation device is configured to determine whether or not the autonomous driving device can cause the moving body to enter the destination.

3. The navigation device according to claim 1, further comprising an obstacle detecting device configured to detect the object.

4. The navigation device according to claim 1, wherein
    the destination is a parking lot, and
    the circuitry is configured to display the message indicating that the destination cannot be entered, in a case in which the recognized character represents that the parking lot is full.

5. The navigation device according to claim 1, wherein the circuitry is further configured,
    in a case in which the moving body is parked in a place other than the destination in response to the recognized character written on the object representing prohibition of entry into the destination, to transmit, as an alternate location, a location of the place to the information processing apparatus via the network; and
    in a case in which the navigation device receives the response to the inquiry from the information processing apparatus indicating that the destination cannot be entered, to receive the alternate location from the information processing apparatus, and
    to set the alternate location as a new destination.

6. The navigation device according to claim 5, wherein the circuitry is further configured,
    in a case in which the navigation device receives, from the information processing apparatus, the response to the inquiry indicating that the destination cannot be entered, and the alternate location,
        to display, on a display device, an indication that the destination cannot be entered, and an electronic map illustrating the alternate location, and
        to receive an instruction as to whether to change the destination or not.

7. A destination guiding system for guiding a moving body to a destination, the destination guiding system comprising:
    an information processing apparatus; and
    a navigation device communicable with the information processing apparatus via a network, the navigation device including
        an image capturing device;
        a position detecting device configured to detect a position of the moving body; and
        circuitry configured
            to receive an input of a destination from a driver of the moving body;
            to make an inquiry, to the information processing apparatus, on whether or not the destination can be entered;
            to receive a response to the inquiry from the information processing apparatus;
            to change the destination, in a case in which the response to the inquiry received from the information processing apparatus indicates that the destination cannot be entered;
            to determine whether or not the moving body has arrived at the destination based on the position detected by the position detecting device; and in response to the determination that the moving body has arrived at the destination,
to detect an object provided at an entrance of the destination from an image captured by the image capturing device;
to detect whether a character string representing prohibition of entry into the destination is written on the object by performing a character recognition of the image captured by the image capturing device, in order to determine whether or not the destination can be entered;
in response to the character string representing prohibition of entry into the destination being detected,
to display a message indicating that the destination cannot be entered, to choose an alternate destination; and
in response to the character string representing prohibition of entry into the destination not being detected,
to skip displaying the message indicating that the destination cannot be entered and to skip choosing the alternate destination,
wherein the circuitry is further configured,
to transmit, to an information processing apparatus via a network, information indicating that the destination cannot be entered, in response to the recognized character written on the object representing prohibition of entry into the destination;
to receive an input of a destination from a driver of the moving body;
to make an inquiry, to an information processing apparatus, on whether or not the destination can be entered;
to receive a response to the inquiry from the information processing apparatus; and
to change the destination, in a case in which the response to the inquiry received from the information processing apparatus indicates that the destination cannot be entered.

8. A non-transitory computer-readable recording medium storing a computer program to cause a processor in an information processing device to execute a process including:
determining whether or not the moving body has arrived at the destination based on a position detected by a position detecting device of the information processing device; and
in response to the determination that the moving body has arrived at the destination,
detecting an object provided at an entrance of the destination from an image captured by an image capturing device of the information processing device;
detecting whether a character string representing prohibition of entry into the destination is written on the object by performing a character recognition of the image captured by the image capturing device, in order to determine whether or not the destination can be entered;
in response to the character string representing prohibition of entry into the destination being detected, displaying a message indicating that the destination cannot be entered, choosing an alternate destination; and
in response to the character string representing prohibition of entry into the destination not being detected, skipping the displaying of the message indicating that the destination cannot be entered and skipping the choosing of the alternate destination,
wherein the process further includes,
transmitting, to an information processing apparatus via a network, information indicating that the destination cannot be entered, in response to the recognized character written on the object representing prohibition of entry into the destination;
receiving an input of a destination from a driver of the moving body;
making an inquiry, to an information processing apparatus, on whether or not the destination can be entered;
receiving a response to the inquiry from the information processing apparatus; and
changing the destination, in a case in which the response to the inquiry received from the information processing apparatus indicates that the destination cannot be entered.

9. The destination guiding system according to claim 7, wherein the circuitry is further configured,
in a case in which the moving body is parked in a place other than the destination in response to the recognized character written on the object representing prohibition of entry into the destination, to transmit, as an alternate location, a location of the place to the information processing apparatus via the network; and
in a case in which the navigation device receives the response to the inquiry from the information processing apparatus indicating that the destination cannot be entered, to receive the alternate location from the information processing apparatus, and
to set the alternate location as a new destination.

10. The destination guiding system according to claim 9, wherein the circuitry is further configured,
in a case in which the navigation device receives the response to the inquiry indicating that the destination cannot be entered and the alternate location,
to display, on a display device of the navigation device, an indication that the destination cannot be entered, and an electronic map illustrating the alternate location, and
to receive an instruction as to whether to change the destination or not.

* * * * *